US012580712B2

(12) United States Patent
Rahman et al.

(10) Patent No.: US 12,580,712 B2
(45) Date of Patent: Mar. 17, 2026

(54) METHOD AND APPARATUS FOR CONFIGURING SEMI-PERSISTENT CSI-RS RESOURCES

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 406 days.

(21) Appl. No.: 18/189,149

(22) Filed: Mar. 23, 2023

(65) Prior Publication Data

US 2023/0318793 A1 Oct. 5, 2023

Related U.S. Application Data

(60) Provisional application No. 63/447,816, filed on Feb. 23, 2023, provisional application No. 63/346,519, (Continued)

(51) Int. Cl.
| | |
|---|---|
| *H04L 5/00* | (2006.01) |
| *H04B 7/06* | (2006.01) |
| *H04W 72/11* | (2023.01) |

(52) U.S. Cl.
CPC ......... *H04L 5/0057* (2013.01); *H04B 7/0626* (2013.01); *H04L 5/0048* (2013.01); *H04W 72/11* (2023.01)

(58) Field of Classification Search
CPC ... H04L 5/0057; H04L 5/0048; H04L 1/0026; H04L 1/0027; H04L 5/0051;
(Continued)

(56) References Cited

U.S. PATENT DOCUMENTS

| | | | |
|---|---|---|---|
| 2021/0143885 A1* | 5/2021 | Großmann | ........... H04B 7/0617 |
| 2021/0226674 A1 | 7/2021 | Ramireddy et al. | |

(Continued)

FOREIGN PATENT DOCUMENTS

WO 2021028331 A1 2/2021

OTHER PUBLICATIONS

WO_2021154020_A1 (Aug. 2021).*

(Continued)

*Primary Examiner* — Rushil P. Sampat

(57) ABSTRACT

Apparatuses and methods for configuring semi-persistent CSI-RS resources are provided. A method performed by a user equipment (UE) includes receiving a configuration about a channel state information (CSI) report. The configuration includes information about a CSI reference signal (CSI-RS) burst including B>1 time instances of a CSI-RS transmission. The CSI-RS burst is based on K≥1 CSI-RS resources. The method further includes measuring the CSI-RS burst and identifying a value d, where d is a number of consecutive time instances that are included in a Doppler domain (DD) unit of DD units. The method further includes determining multiple DD basis vectors, where each of the multiple DD basis vectors is associated with $N_4>1$ of the DD units and where $N_4$ is a length of each of the multiple DD basis vectors, and transmitting the CSI report including an indication about the multiple DD basis vectors.

6 Claims, 19 Drawing Sheets

Related U.S. Application Data filed on May 27, 2022, provisional application No. 63/327,724, filed on Apr. 5, 2022, provisional application No. 63/325,425, filed on Mar. 30, 2022.

(58) Field of Classification Search
CPC .... H04L 5/0053; H04L 5/0094; H04W 72/11; H04B 7/0626; H04B 17/24; H04B 7/0663; H04B 17/373; H04B 7/0417; H04B 7/046; H04B 7/0478; H04B 7/0481; Y02D 30/70
See application file for complete search history.

(56) References Cited

U.S. PATENT DOCUMENTS

| | | | |
|---|---|---|---|
| 2022/0029676 A1 | 1/2022 | Ramireddy et al. | |
| 2023/0246696 A1* | 8/2023 | Kim | H04L 5/0053 370/252 |
| 2025/0007586 A1* | 1/2025 | Xi | H04B 7/063 |
| 2025/0055505 A1* | 2/2025 | Huang | H04L 5/0048 |

OTHER PUBLICATIONS

International Search Report and Written Opinion issued Jul. 14, 2023 regarding International Application No. PCT/KR2023/004324, 8 pages.
ZTE, "Initial views on Rel-18 MIMO evolution", 3GPP TSG RAN WG1 Meeting #108-e, R1-2201192, Feb. 2022, 11 pages.
"3rd Generation Partnership Project; Technical Specification Group Radio Access Network; NR; Physical layer procedures for data (Release 16)", 3GPP TS 38.214 V16.8.0, Dec. 2021, 172 pages.
"3rd Generation Partnership Project; Technical Specification Group Radio Access Network; Evolved Universal Terrestrial Radio Access (E-UTRA); Physical channels and modulation (Release 17)", 3GPP TS 36.211 V17.0.0, Dec. 2021, 250 pages.
"3rd Generation Partnership Project; Technical Specification Group Radio Access Network; Evolved Universal Terrestrial Radio Access (E-UTRA); Multiplexing and channel coding (Release 17)", 3GPP TS 36.212 V17.0.0, Dec. 2021, 258 pages.
"3rd Generation Partnership Project; Technical Specification Group Radio Access Network; Evolved Universal Terrestrial Radio Access (E-UTRA); Physical layer procedures (Release 17)", 3GPP TS 36.213 V17.0.0, Dec. 2021, 582 pages.
"3rd Generation Partnership Project; Technical Specification Group Radio Access Network; Evolved Universal Terrestrial Radio Access (E-UTRA); Medium Access Control (MAC) protocol specification (Release 17)", 3GPP TS 36.321 V17.0.0, Mar. 2022, 146 pages.
"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331 V17.0.0, Mar. 2022, 1119 pages.
"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.
"3rd Generation Partnership Project; Technical Specification Group Radio Access Network; NR; Multiplexing and channel coding (Release 17)", 3GPP TS 38.212 V17.0.0, Dec. 2021, 190 pages.
"3rd Generation Partnership Project; Technical Specification Group Radio Access Network; NR; Physical layer for procedures for data (Release 17)", 3GPP TS 38.214 V17.0.0, Dec. 2021, 217 pages.
Fraunhofer IIS, et al., "Measurement results on Doppler spectrum for various UE mobility environments and related CSI enhancements", 3GPP TSG RAN WG#86, RP-192978, Dec. 2019, 13 pages.
"3rd Generation Partnership Project; Technical Specification Group Radio Access Network; NR; Physical channels and modulation (Release 17)", 3GPP TS 38.211 V17.0.0, Dec. 2021, 134 pages.
"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.

* cited by examiner

800

810 Data Bits

820 Encoder

830 Modulator

DFT 840

RE mapping 850

IFFT 860   855

870 Filter

880 Transmitted

Control of transmission BW

900

910 Received

920 Filter

FFT 930

RE mapping 940

IDFT 950

960 Demodulator

970 Decoder

980 Data Bits

Control of Reception BW   945

Port layout in a panel $N_2$-1   X   X   X   X     X

⋮

2$^{nd}$ dim.   X   X   X   X ··· X
X   X   X   X    X
0 X   X   X     X
0           $N_1$-1

1$^{st}$ dim.

Single panel $Ng = 1$

Multi-panel $Ng = 2$            $Ng = 4$ 3D grid of beams in
($1^{st}$ port dim., $2^{nd}$ port dim., freq. dim.)

$O_3N_3$-1

Frequency dim.

$2^{nd}$ port dim.

$O_2N_2$-1

1

0

1

0

0　1　2

$O_1N_1$-1

$1^{st}$ port dim.

1600

Figure 20:
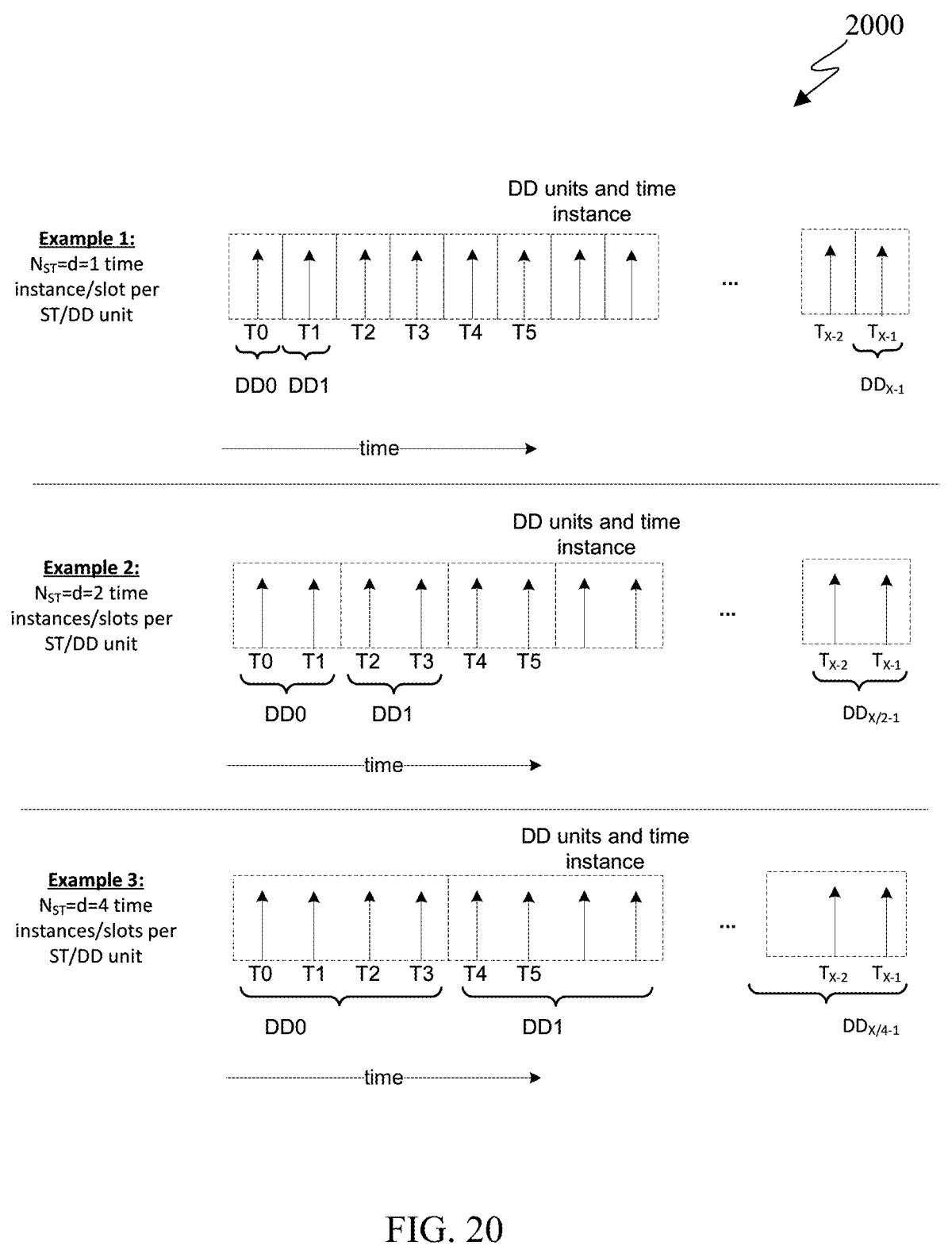

2000

Example 1:
$N_{ST}=d=1$ time
instance/slot per
ST/DD unit

DD units and time
instance

T0   T1   T2   T3   T4   T5       $T_{X-2}$   $T_{X-1}$

DD0   DD1       $DD_{X-1}$

————time————►

Example 2:
$N_{ST}=d=2$ time
instances/slots per
ST/DD unit

DD units and time
instance

T0   T1   T2   T3   T4   T5       $T_{X-2}$   $T_{X-1}$

DD0    DD1       $DD_{X/2-1}$

————time————►

Example 3:
$N_{ST}=d=4$ time
instances/slots per
ST/DD unit

DD units and time
instance

T0   T1   T2   T3   T4   T5       $T_{X-2}$   $T_{X-1}$

DD0     DD1       $DD_{X/4-1}$

————time————►

2202 — Receive a configuration about a CSI report.

2204 — Measure the CSI-RS burst.

2206 — Identify a value $d$.

2208 — Determine multiple DD basis vectors.

2210 — Transmit the CSI report including an indication about the multiple DD basis vectors.

METHOD AND APPARATUS FOR CONFIGURING SEMI-PERSISTENT CSI-RS RESOURCES

CROSS-REFERENCE TO RELATED APPLICATION AND CLAIM OF PRIORITY

This application claims priority under 35 U.S.C. § 119(e) to U.S. Provisional Patent Application No. 63/325,425 filed on Mar. 30, 2022, U.S. Provisional Patent Application No. 63/327,724 filed on Apr. 5, 2022, U.S. Provisional Patent Application No. 63/346,519 filed on May 27, 2022, and U.S. Provisional Patent Application No. 63/447,816 filed on Feb. 23, 2023. The above-identified provisional patent applications are hereby incorporated by reference in their entirety.

TECHNICAL FIELD

The present disclosure relates generally to wireless communication systems and, more specifically, to configuring semi-persistent channel state information reference signal (CSI-RS) resources.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for configuring semi-persistent CSI-RS resources.

In one embodiment, a user equipment (UE) is provided. The UE includes a transceiver configured to receive a configuration about a CSI report. The configuration includes information about a CSI-RS burst comprising B>1 time instances of a CSI-RS transmission. The CSI-RS burst is based on K≥1 CSI-RS resources. The UE further includes a processor operably coupled to the transceiver. The processor is configured to measure the CSI-RS burst, identify a value d, where d is a number of consecutive time instances that are included in a Doppler domain (DD) unit of DD units, and determine multiple DD basis vectors, where each of the multiple DD basis vectors is associated with $N_4>1$ of the DD units and where $N_4$ is a length of each of the multiple DD basis vectors. The transceiver is further configured to transmit the CSI report including an indication about the multiple DD basis vectors.

In another embodiment, a base station (BS) is provided. The BS includes a processor configured to generate a configuration about a CSI report. The configuration includes information about a CSI-RS burst comprising B>1 time instances of a CSI-RS transmission. The CSI-RS burst is based on K≥1 CSI-RS resources. The BS further includes a transceiver operably coupled to the processor. The transceiver is configured to transmit the configuration and receive the CSI report including an indication about multiple DD basis vectors, where each of the multiple DD basis vectors is associated with $N_4>1$ DD units and where $N_4$ is a length of each of the multiple DD basis vectors. A value d is a number of consecutive time instances that are included in a DD unit of the DD units.

In yet another embodiment, a method performed by a UE is provided. The method includes receiving a configuration about a CSI report. The configuration includes information about a CSI-RS burst comprising B>1 time instances of a CSI-RS transmission. The CSI-RS burst is based on K≥1 CSI-RS resources. The method further includes measuring the CSI-RS burst and identifying a value d, where d is a number of consecutive time instances that are included in a DD unit of DD units. The method further includes determining multiple DD basis vectors, where each of the multiple DD basis vectors is associated with $N_4>1$ of the DD units and where $N_4$ is a length of each of the multiple DD basis vectors, and transmitting the CSI report including an indication about the multiple DD basis vectors.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

4

Figure 18:
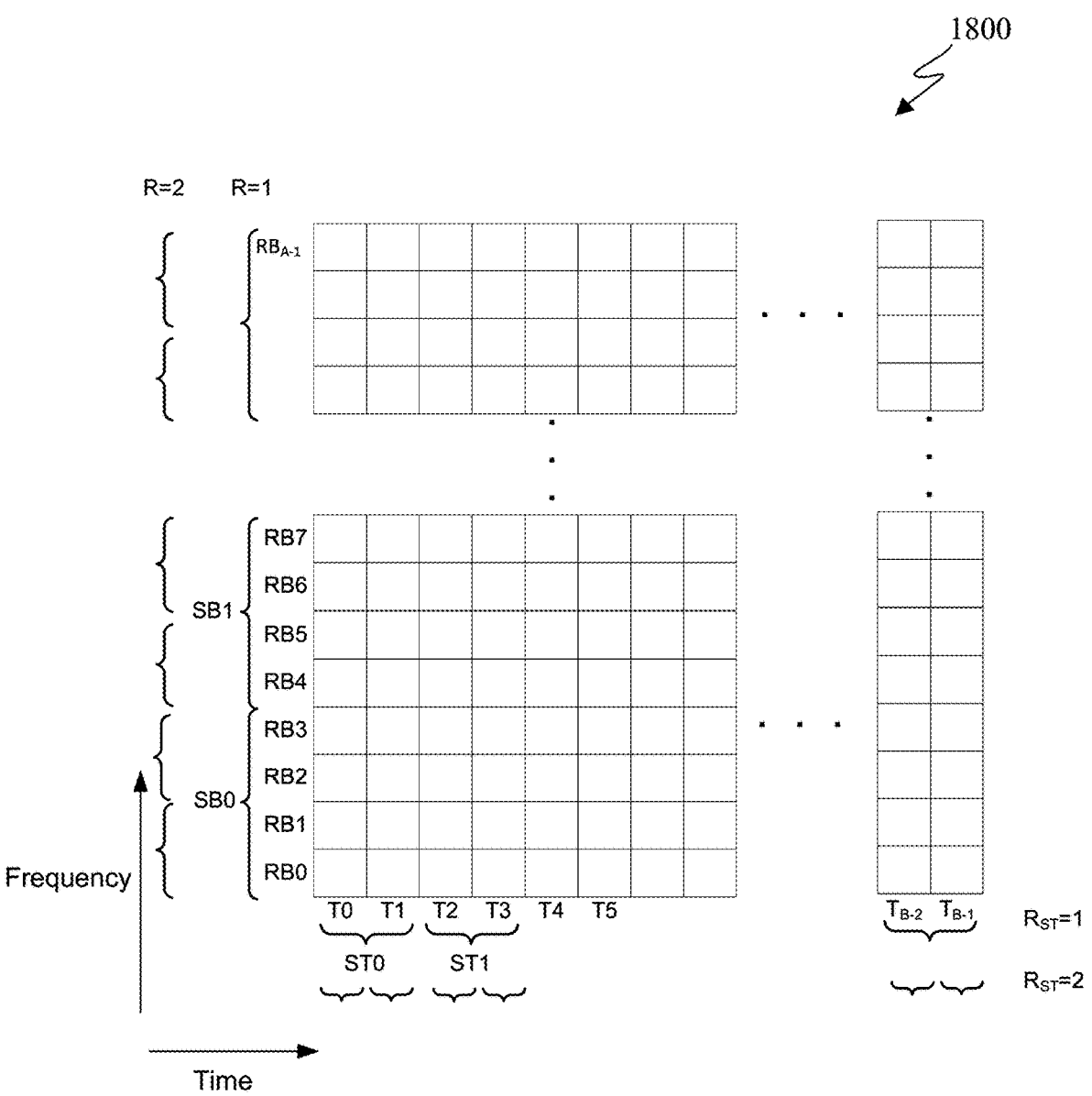
Figure 19:
Figure 19:
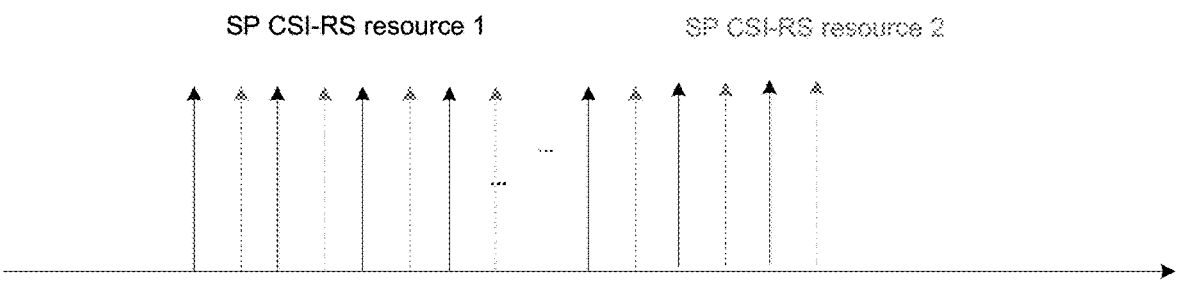
Figure 21:
Figure 21:
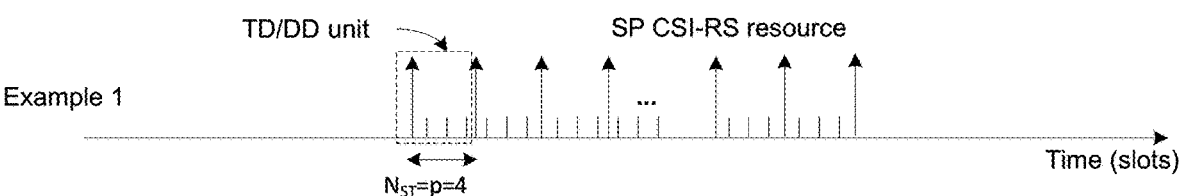
Figure 21:
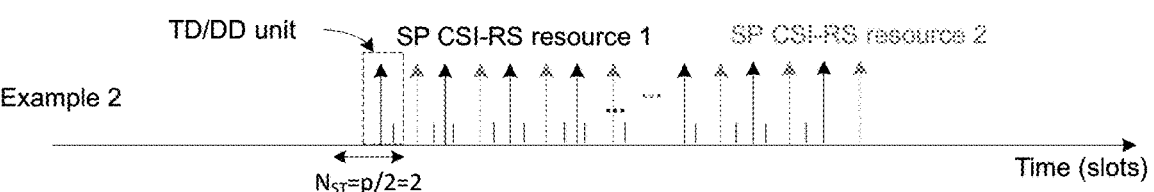
Figure 22:
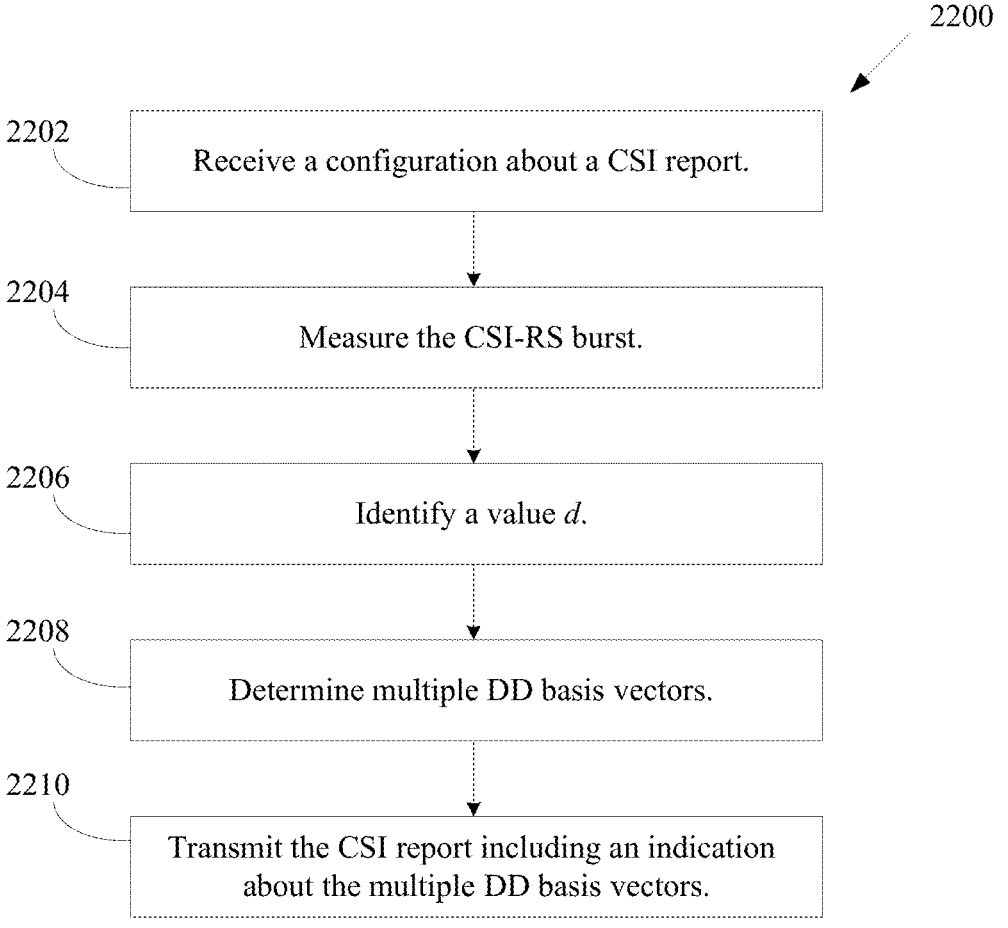

FIG. 18 illustrates an example of a UE configured to partition resource blocks (RBs) into subbands and time instances into sub-times according to embodiments of the present disclosure;

FIG. 19 illustrates an example of a UE configured with multiple SP CSI-RS resources within a CSI-RS resource set according to embodiments of the present disclosure;

FIG. 20 illustrates an example of a UE configured to determine a value of $N_4$ based on the value B and/or C in a CSI-RS burst according to embodiments of the present disclosure;

FIG. 21 illustrates an example of a UE configured based on the time domain/doppler domain (TD/DD) unit size $N_{ST}$ according to embodiments of the present disclosure; and FIG. 22 illustrates an example of a method of operating a UE according to various embodiments of the present disclosure.

DETAILED DESCRIPTION

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0, "E-UTRA, Physical Layer Procedures" (herein "REF 3"); 3GPP TS 36.321 v17.0.0, "E-UTRA, Medium Access Control (MAC) protocol specification" (herein "REF 4"); 3GPP TS 36.331 v17.0.0, "E-UTRA, Radio Resource Control (RRC) protocol specification" (herein "REF 5"); 3GPP TR 22.891 v1.2.0 (herein "REF 6"); 3GPP TS 38.212 v17.0.0, "E-UTRA, NR, Multiplexing and channel coding" (herein "REF 7"); 3GPP TS 38.214 v17.0.0; "NR, Physical Layer Procedures for Data" (herein "REF 8"); RP-192978, "Measurement results on Doppler spectrum for various UE mobility environments and related CSI enhancements," Fraunhofer IIS, Fraunhofer HHI, Deutsche Telekom (herein "REF 9"); 3GPP TS 38.211 v17.0.0, "E-UTRA, NR, Physical channels and modulation" (herein "REF 10"); and 3GPP TS 38.331 v17.0.0, "E-UTRA, NR, Radio Resource Control (RRC) Protocol Specification (herein "REF 11")."

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave)

bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
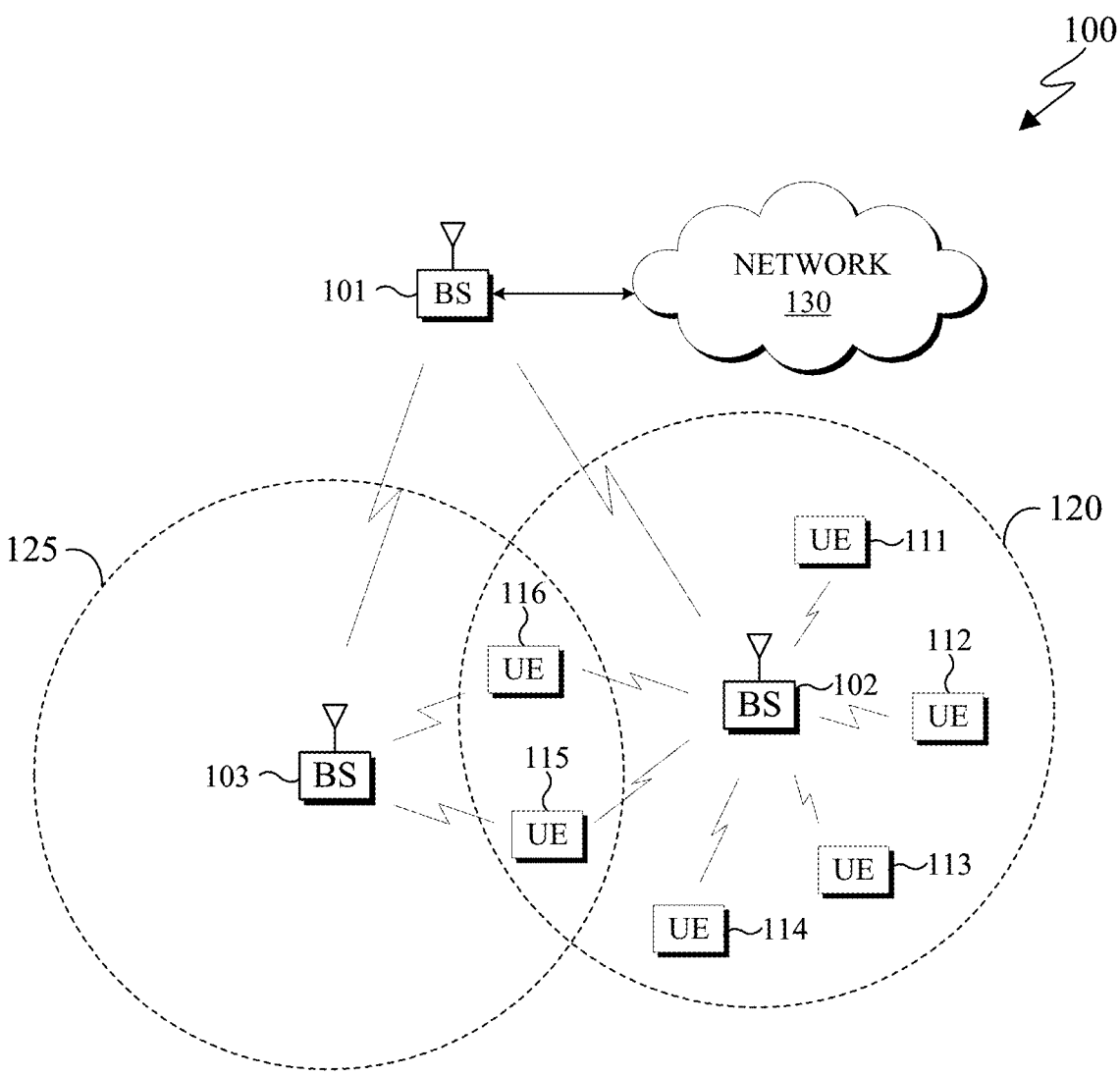
FIG. 1 illustrates an example wireless network according to embodiments of the present disclosure.
Figure 2:
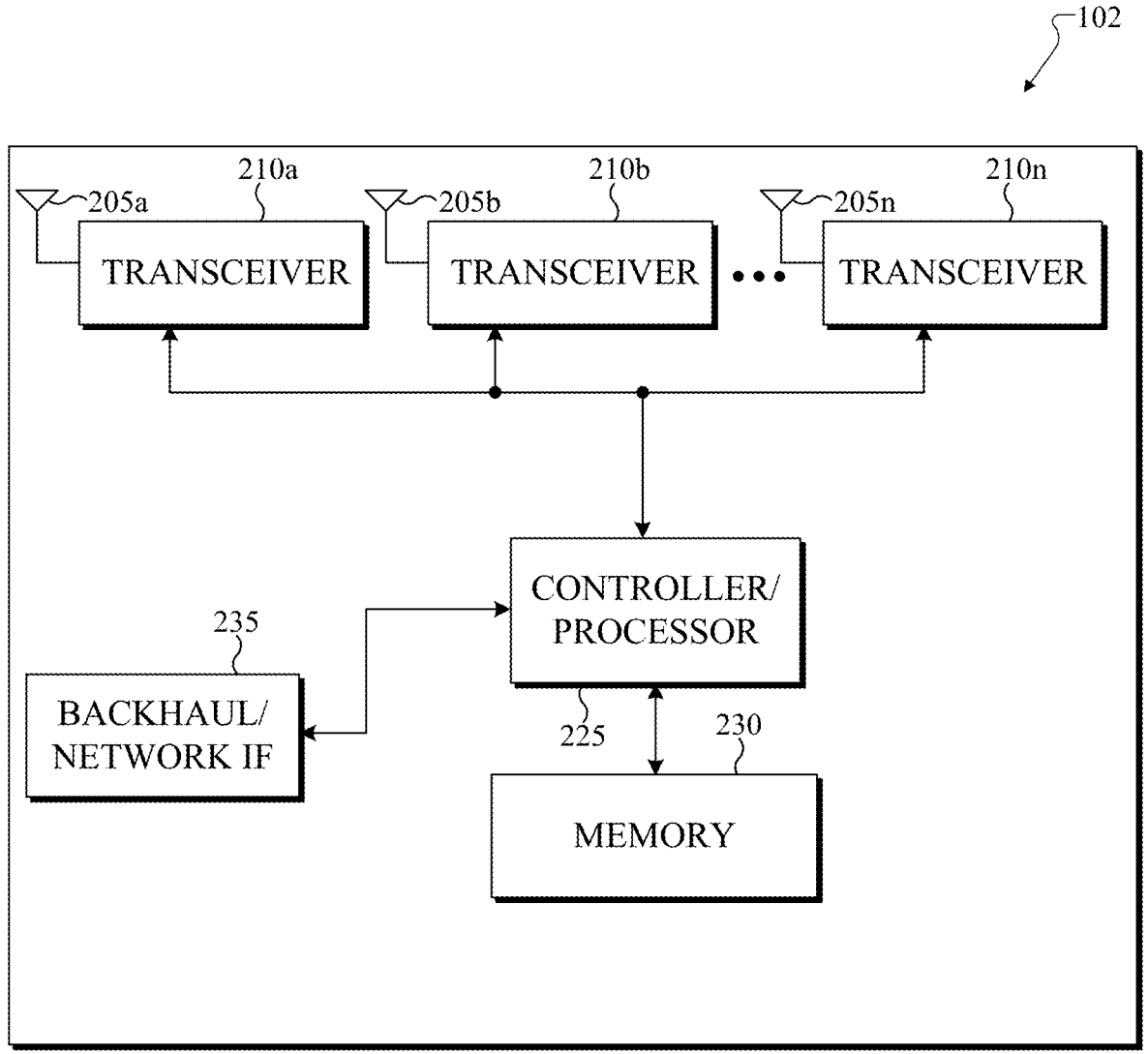
FIG. 2 illustrates an example gNodeB (gNB) according to embodiments of the present disclosure.
Figure 3:
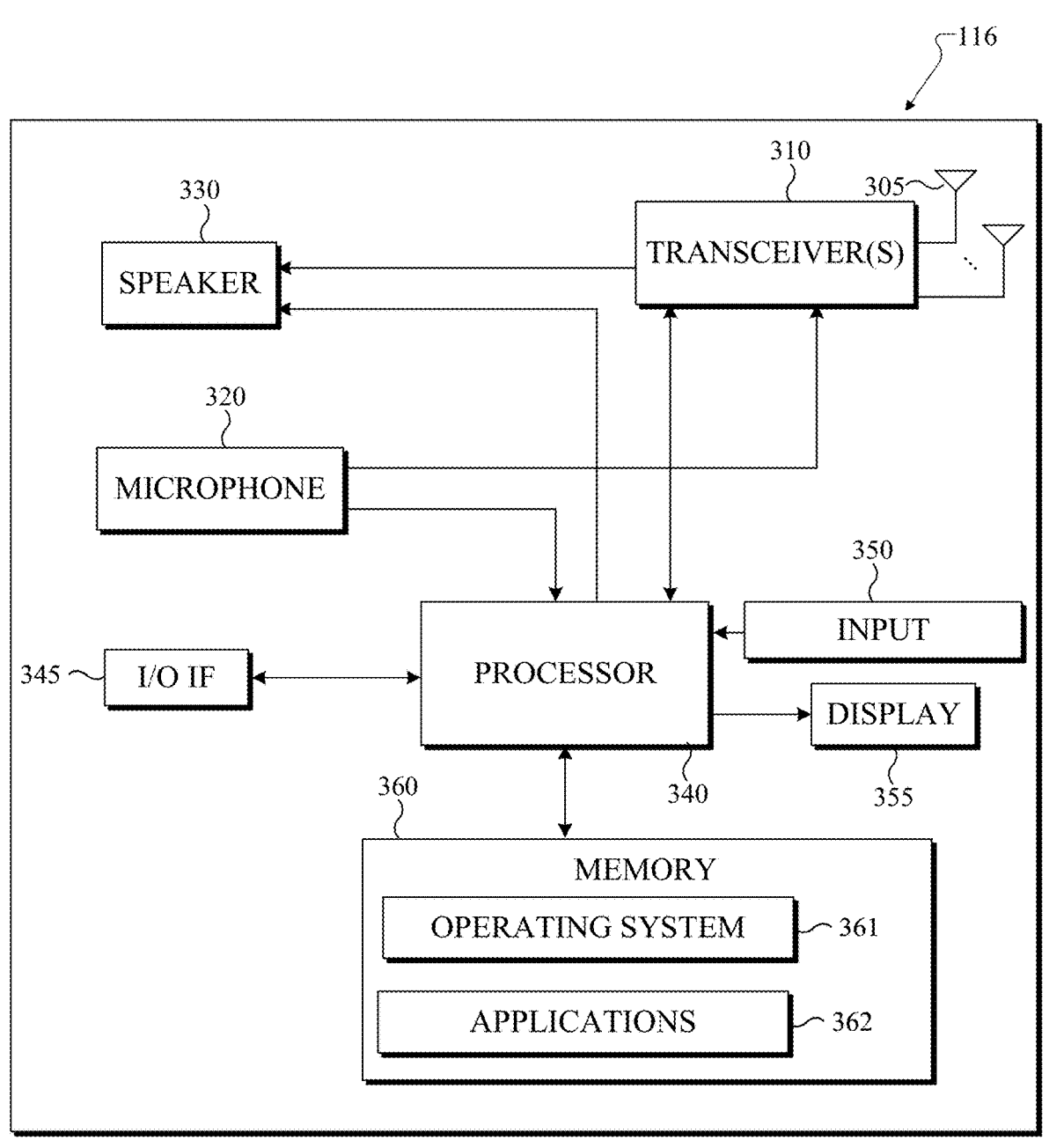
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for supporting configuration of semi-persistent CSI-RS resources. In certain embodiments, one or more of the BSs 101-103 include circuitry, programing, or a combination thereof for supporting configuration of semi-persistent CSI-RS resources.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for supporting configuration of semi-persistent CSI-RS resources. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for utilizing configuration of semi-persistent CSI-RS resources as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
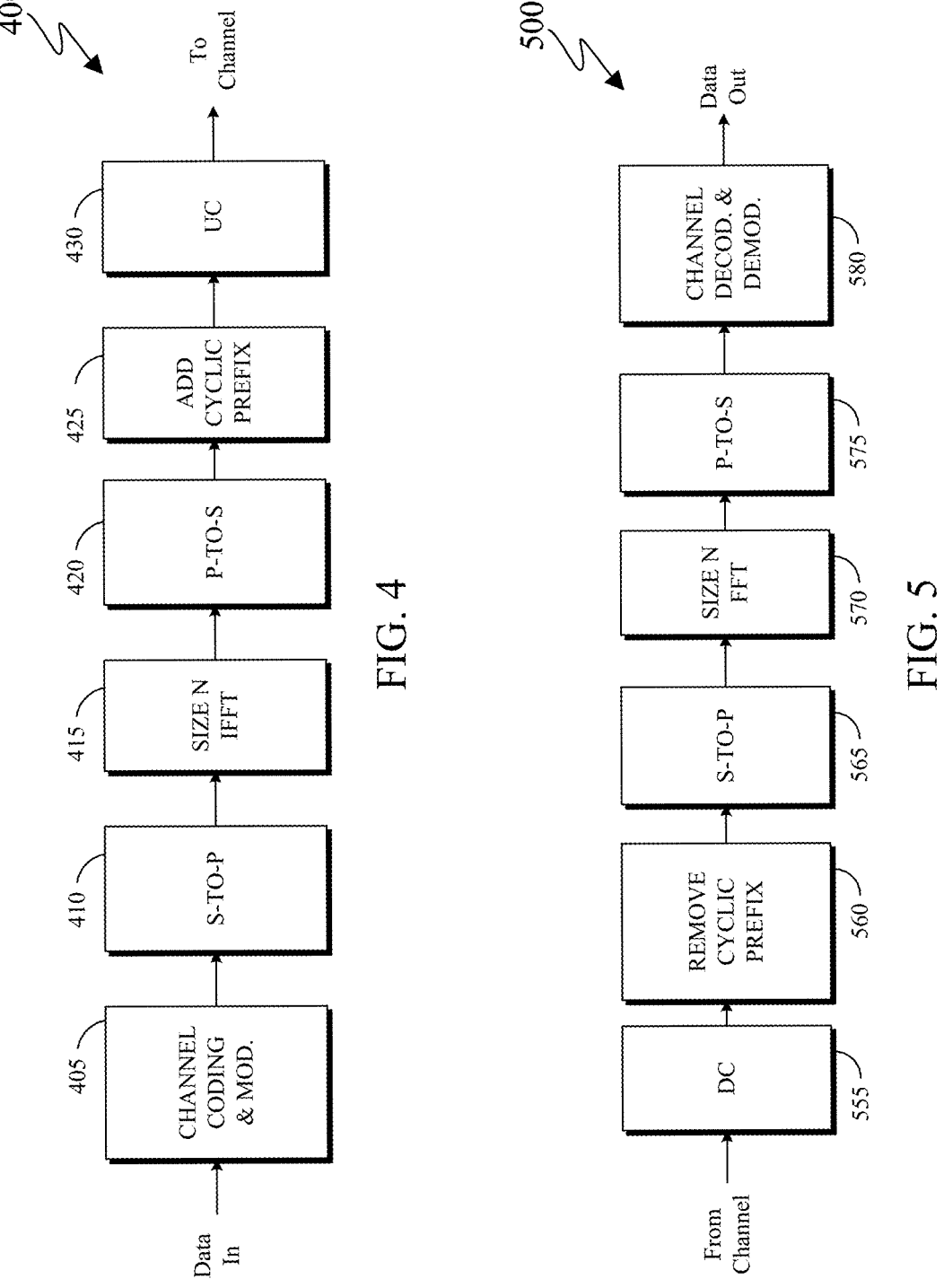
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support configuring CSI-RS resources as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serialto-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH)—see also REF 3. An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH}\cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH (see also REF 3).

An UL subframe includes two slots. Each slot includes $N_{symb}^{UL}$ symbols for transmitting data information, UCI, DMRS, or SRS. A frequency resource unit of an UL system BW is an RB. A UE is allocated $N_{RB}$ RBs for a total of $N_{RB}\cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2\cdot(N_{symb}^{UL}-1)-N_{SRS}$, where $N_{SRS}=1$ if a last subframe symbol is used to transmit SRS and $N_{SRS}=0$ otherwise.

Figure 6:
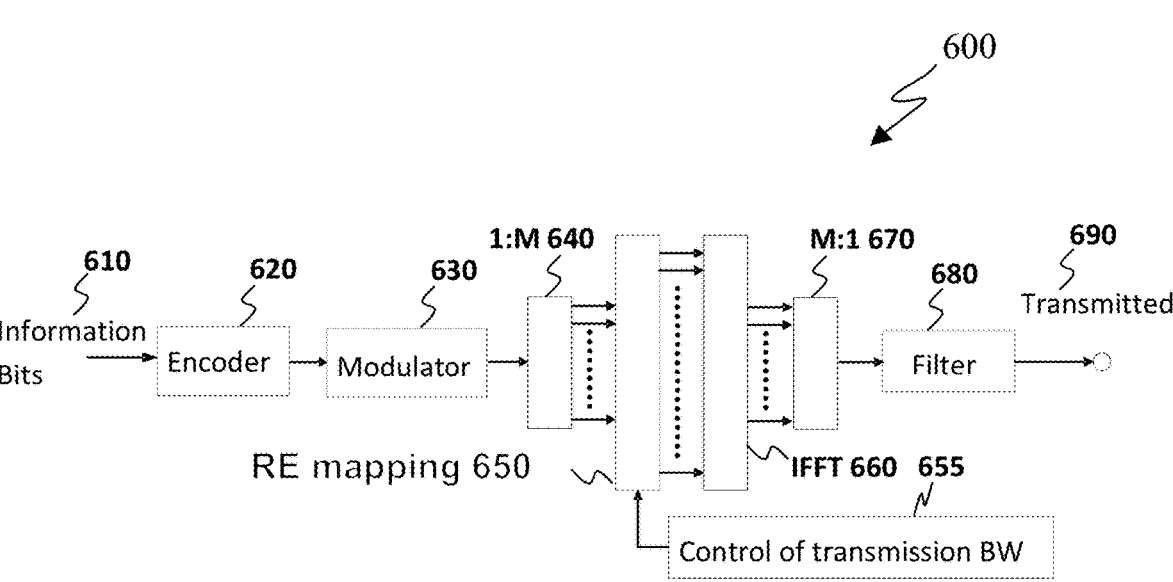
FIG. 6 illustrates a transmitter block diagram for a physical downlink shared channel (PDSCH) in a subframe according to embodiments of the present disclosure.

FIG. 6 illustrates a transmitter block diagram 600 for a PDSCH in a subframe according to embodiments of the present disclosure. The embodiment of the transmitter block diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the transmitter block diagram 600.

As shown in FIG. 6, information bits 610 are encoded by encoder 620, such as a turbo encoder, and modulated by modulator 630, for example using quadrature phase shift keying (QPSK) modulation. A serial to parallel (S/P) converter 640 generates M modulation symbols that are subsequently provided to a mapper 650 to be mapped to REs selected by a transmission BW selection unit 655 for an assigned PDSCH transmission BW, unit 660 applies an Inverse fast Fourier transform (IFFT), the output is then serialized by a parallel to serial (P/S) converter 670 to create a time domain signal, filtering is applied by filter 680, and a signal transmitted 690. Additional functionalities, such as data scrambling, cyclic prefix insertion, time windowing, interleaving, and others are well known in the art and are not shown for brevity.

Figure 7:
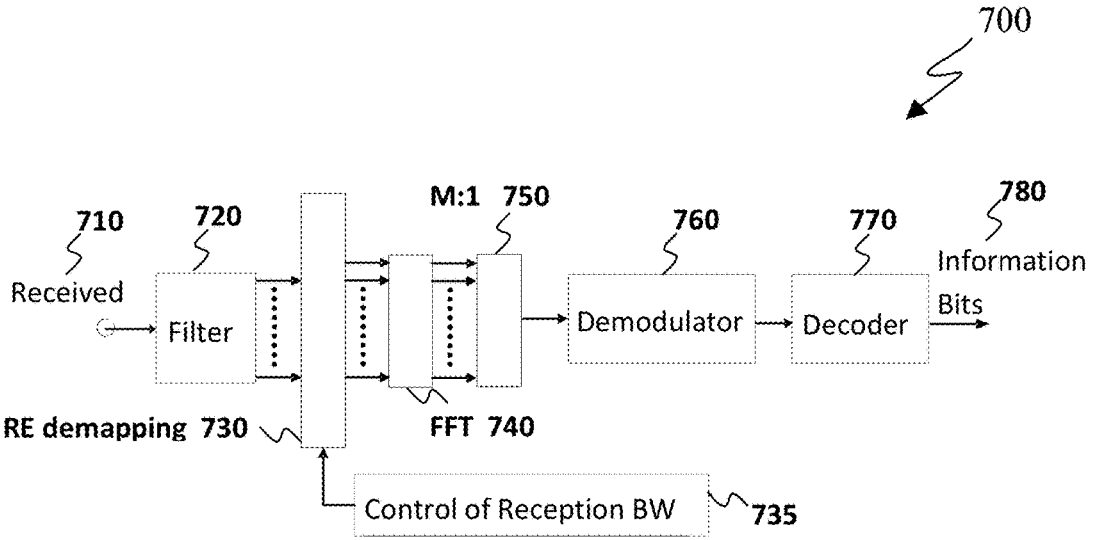
FIG. 7 illustrates a receiver block diagram for a PDSCH in a subframe according to embodiments of the present disclosure.

FIG. 7 illustrates a receiver block diagram 700 for a PDSCH in a subframe according to embodiments of the present disclosure. The embodiment of the diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the diagram 700.

As shown in FIG. 7, a received signal 710 is filtered by filter 720, REs 730 for an assigned reception BW are selected by BW selector 735, unit 740 applies a fast Fourier transform (FFT), and an output is serialized by a parallel-to-serial converter 750. Subsequently, a demodulator 760 coherently demodulates data symbols by applying a channel estimate obtained from a DMRS or a CRS (not shown), and a decoder 770, such as a turbo decoder, decodes the demodulated data to provide an estimate of the information data bits 780. Additional functionalities such as time-windowing, cyclic prefix removal, de-scrambling, channel estimation, and de-interleaving are not shown for brevity.

Figure 8:
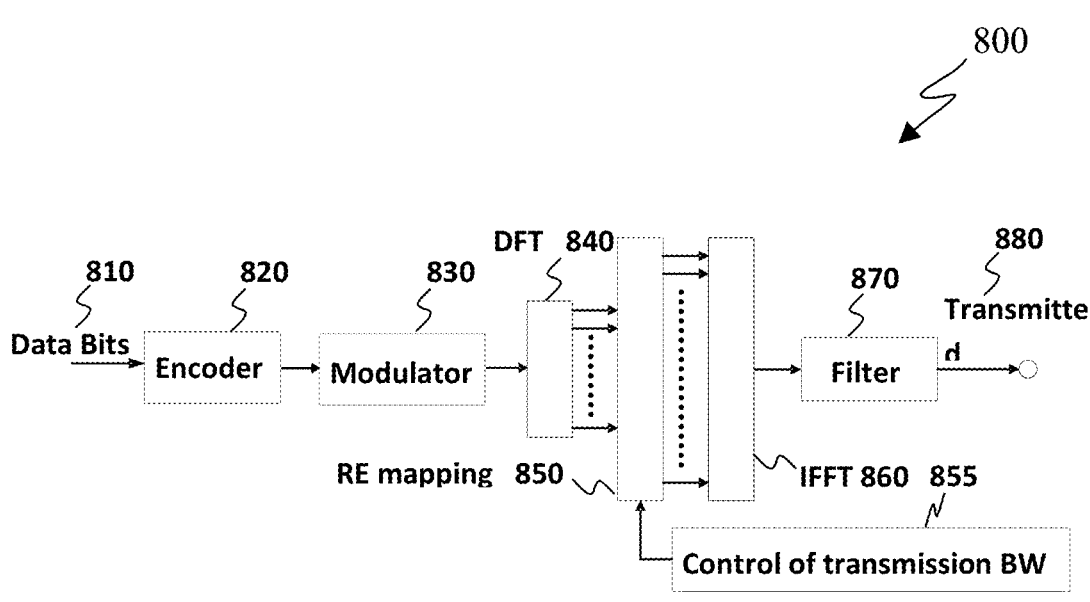
FIG. 8 illustrates a transmitter block diagram for a physical uplink shared channel (PUSCH) in a subframe according to embodiments of the present disclosure.

FIG. 8 illustrates a transmitter block diagram 800 for a PUSCH in a subframe according to embodiments of the present disclosure. One or more of the components illustrated in FIG. 7 can be implemented in specialized circuitry configured to perform the noted functions or one or more of the components can be implemented by one or more processors executing instructions to perform the noted functions. The embodiment of the block diagram 800 illustrated in FIG. 8 is for illustration only. FIG. 8 does not limit the scope of this disclosure to any particular implementation of the block diagram 800.

As shown in FIG. 8, information data bits 810 are encoded by encoder 820, such as a turbo encoder, and modulated by modulator 830. A discrete Fourier transform (DFT) unit 840 applies a DFT on the modulated data bits, REs 850 corresponding to an assigned PUSCH transmission BW are selected by transmission BW selection unit 855, unit 860 applies an IFFT and, after a cyclic prefix insertion (not shown), filtering is applied by filter 870 and a signal transmitted 880.

Figure 9:
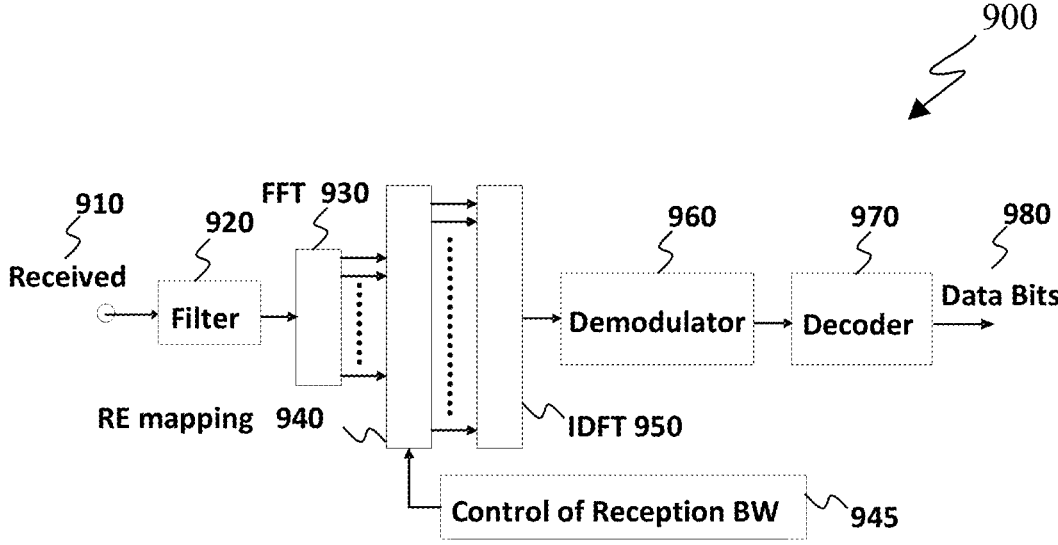
FIG. 9 illustrates a receiver block diagram for a PUSCH in a subframe according to embodiments of the present disclosure.

FIG. 9 illustrates a receiver block diagram 900 for a PUSCH in a subframe according to embodiments of the present disclosure. The embodiment of the block diagram 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the block diagram 900.

As shown in FIG. 9, a received signal 910 is filtered by filter 920. Subsequently, after a cyclic prefix is removed (not shown), unit 930 applies an FFT, REs 940 corresponding to an assigned PUSCH reception BW are selected by a reception BW selector 945, unit 950 applies an inverse DFT (IDFT), a demodulator 960 coherently demodulates data symbols by applying a channel estimate obtained from a DMRS (not shown), a decoder 970, such as a turbo decoder, decodes the demodulated data to provide an estimate of the information data bits 980.

In next generation cellular systems, various use cases are envisioned beyond the capabilities of LTE system. Termed 5G or the fifth-generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km² with less stringent the reliability, data rate, and latency requirements.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
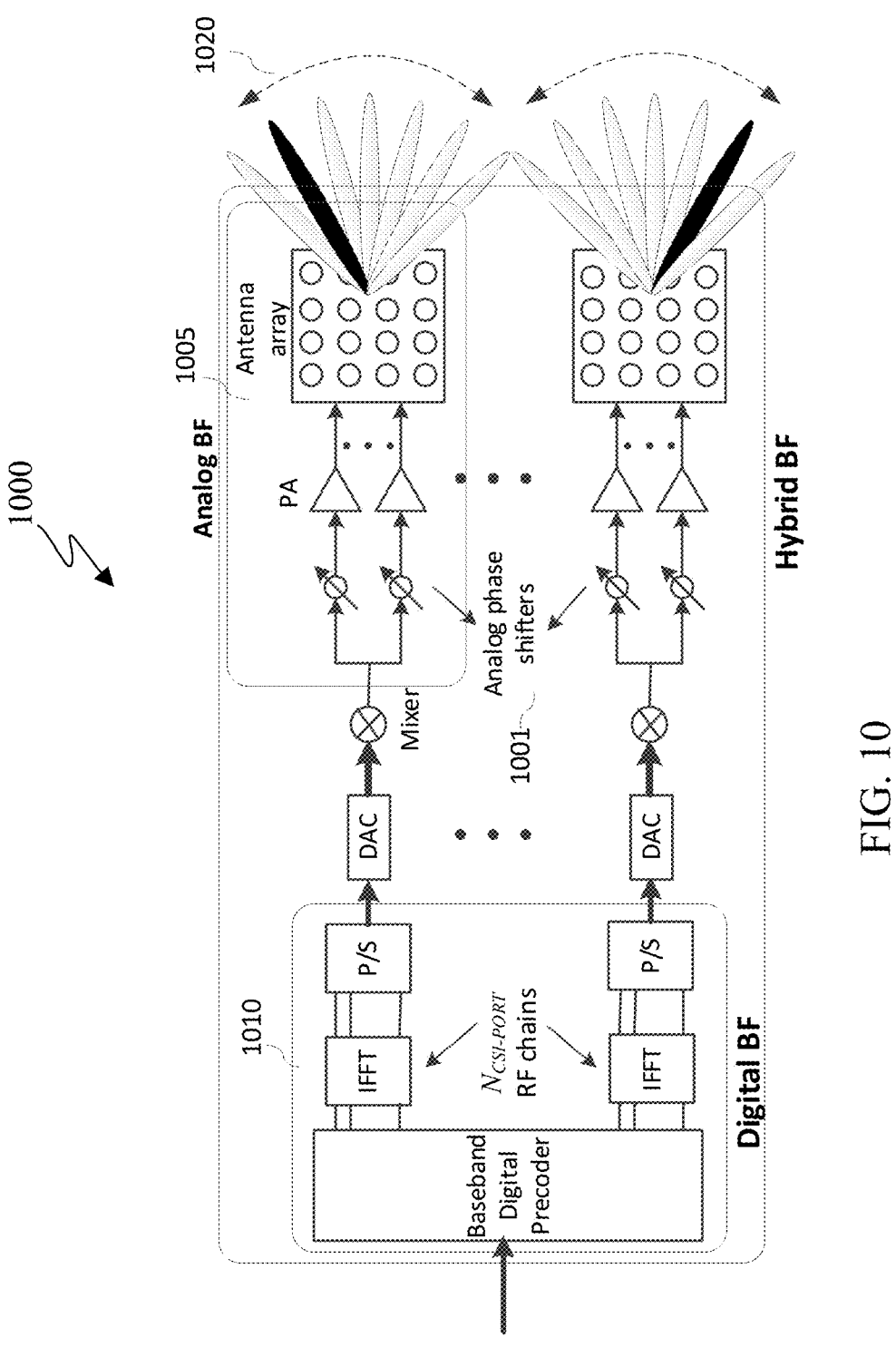
FIG. 10 illustrates an example antenna blocks or arrays forming beams according to embodiments of the present disclosure.

FIG. 10 illustrates an example antenna blocks or arrays 1000 according to embodiments of the present disclosure. The embodiment of the antenna blocks or arrays 1000 illustrated in FIG. 10 is for illustration only. FIG. 10 does not limit the scope of this disclosure to any particular implementation of the antenna blocks or arrays.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters 1001. One CSI-RS port can then correspond to one sub-array which produces a narrow analog beam through analog beamforming 1005. This analog beam can be configured to sweep across a wider range of angles 1020 by varying the phase shifter bank across symbols or subframes. The number of sub-arrays (equal to the number of RF chains) is the same as the number of CSI-RS ports $N_{CSI-PORT}$. A digital beamforming unit 1010 performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanism corresponding to three types of CSI-RS measurement can be considered: 1) 'CLASS A' CSI reporting which corresponds to non-precoded CSI-RS, 2) 'CLASS B' reporting with K=1 CSI-RS resource which corresponds to UE-specific beamformed CSI-RS, 3) 'CLASS B' reporting with K>1 CSI-RS resources which corresponds to cell-specific beamformed CSI-RS. For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (consisting of multiple ports). Here, (at least at a given time/frequency) CSI-RS ports have narrow beam widths and hence not cell wide coverage, and (at least from the eNB (or gNB) perspective) at least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of its representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In a wireless communication system, MIMO is often identified as an essential feature in order to achieve high system throughput requirements. One of the key components of a MIMO transmission scheme is the accurate CSI acquisition at the eNB (or gNB) (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from eNB (or gNB), and CSI acquisition and feedback from UE. In legacy FDD systems, the CSI feedback framework is 'implicit' in the form of CQI/PMI/RI (also CRI and LI) derived from a codebook assuming SU transmission from eNB (or gNB).

In 5G or NR systems [REF7, REF8], the above-mentioned "implicit" CSI reporting paradigm from LTE is also supported and referred to as Type I CSI reporting. In addition, a high-resolution CSI reporting, referred to as Type II CSI reporting, is also supported in Release 15 specification to provide more accurate CSI information to gNB for use cases such as high-order MU-MIMO. However, the overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in REF8). Some of the key components for this feature includes (a) spatial domain (SD) basis $W_1$, (b) FD basis $W_f$, and (c) coefficients $\tilde{W}_2$ that linearly combine SD and FD basis. In a non-reciprocal FDD system, a complete CSI (comprising all components) needs to be reported by the UE. However, when reciprocity or partial reciprocity does exist between UL and DL, then some of the CSI components can be obtained based on the UL channel estimated using SRS transmission from the UE. In Rel. 16 NR, the DFT-based FD compression is extended to this partial reciprocity case (referred to as Rel. 16 enhanced Type II port selection codebook in REF8), wherein the DFT-based SD basis in $W_1$ is replaced with SD CSI-RS port selection, i.e., L out of $P_{CSI-RS}/2$ CSI-RS ports are selected (the selection is common for the two antenna polarizations or two halves of the CSI-RS ports). The CSI-RS ports in this case are beamformed in SD (assuming UL-DL channel reciprocity in angular domain), and the beamforming information can be obtained at the gNB based on UL channel estimated using SRS measurements.

In Rel. 17 NR, CSI reporting has been enhanced to support the following.

Further enhanced Type II port selection codebook: it has been known in the literature that UL-DL channel reciprocity can exist in both angular and delay domains if the UL-DL duplexing distance is small. Since delay in time domain transforms (or closely related to) basis vectors in frequency domain (FD), the Rel. 16 enhanced Type II port selection can be further extended to both angular and delay domains (or SD and FD). In particular, the DFT-based SD basis in $W_1$ and DFT-based FD basis in $W_f$ can be replaced with SD and FD port selection, i.e., L CSI-RS ports are selected in SD and/or M ports are selected in FD. The CSI-RS ports in this case are beamformed in SD (assuming UL-DL channel reciprocity in angular domain) and/or FD (assuming UL-DL channel reciprocity in delay/frequency domain), and the corresponding SD and/or FD beamforming information can be obtained at the gNB based on UL channel estimated using SRS measurements. In Rel. 17, such a codebook is supported (which is referred to as Rel. 17 further enhanced Type II port selection codebook in REF8).

NCJT CSI reporting: When the UE can communicate with multiple TRPs that are distributed at different locations in space (e.g., within a cell), the CSI reporting can correspond to a single TRP hypothesis (i.e., CSI reporting for one of the multiple TRPs), or multi-TRP hypothesis (i.e., CSI reporting for at least two of the multiple TRPs). The CSI reporting for both single TRP and multi-TRP hypotheses are supported in Rel. 17. However, the multi-TRP CSI reporting assume a non-coherent joint transmission (NCJT), i.e., a layer (and precoder) of the transmission is restricted to be transmitted from only one TRP.

The following can be potential further enhancements:

Enhancements of CSI acquisition for Coherent-JT targeting FR1 and up to 4 TRPs, assuming ideal backhaul and synchronization as well as the same number of antenna ports across TRPs, as follows:

Rel-16/17 Type-II codebook refinement for CJT mTRP targeting FDD and its associated CSI reporting, taking into account throughput-overhead trade-off.

Enhancement for high/medium UE velocities by exploiting time-domain correlation/Doppler-domain information to assist DL precoding, targeting FR1, as follows:

Rel-16/17 Type-II codebook refinement, without modification to the spatial and frequency domain basis.

UE reporting of time-domain channel properties measured via CSI-RS for tracking.

The first enhancement can extend the Rel. 17 NCJT CSI to coherent JT (CJT), and the second can extend FD compression in the Rel. 16/17 codebook to include time (Doppler) domain compression. Both extensions can be based on the same legacy codebook, i.e., Rel. 16/17 codebook.

Figure 11:
FIG. 11 illustrates a distributed multi-input multi-output (MIMO) system according to embodiments of the disclosure.
Figure 11:
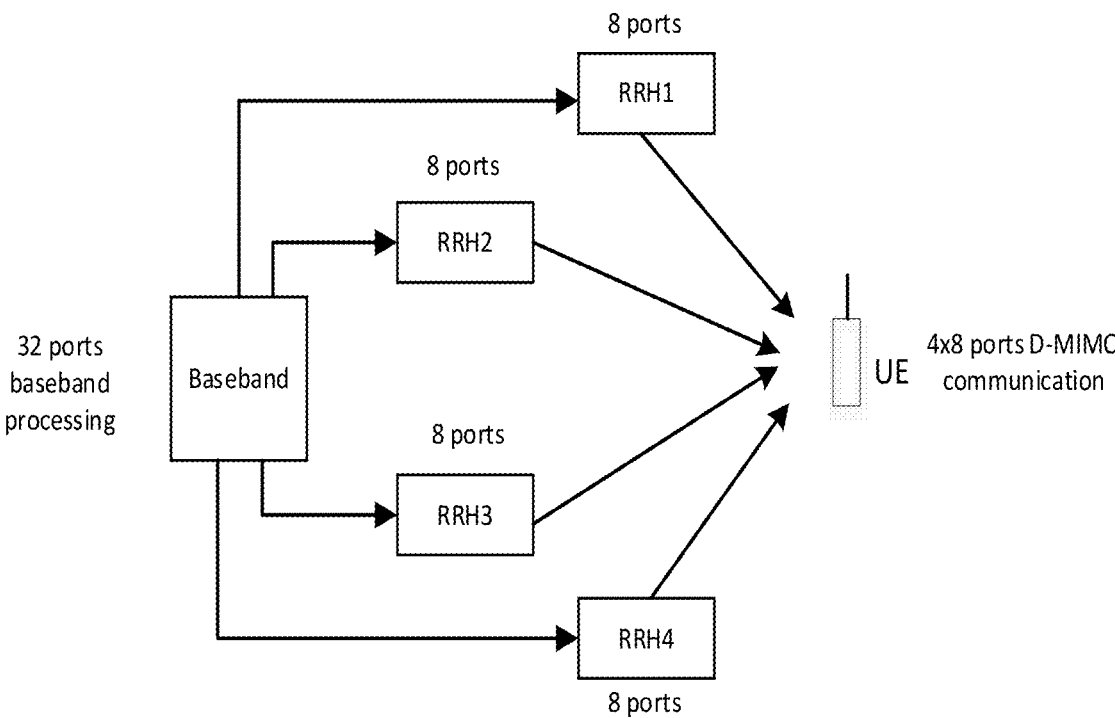

FIG. 11 illustrates a distributed MIMO system 1100 according to embodiments of the disclosure. The embodiment of the distributed MIMO system 1100 illustrated in FIG. 11 is for illustration only. FIG. 11 does not limit the scope of this disclosure to any particular implementation of the distributed MIMO system.

The main use case or scenario of interest for CJT/D-MIMO is as follows. Although NR supports up to 32 CSI-RS antenna ports, for a cellular system operating in a sub-1 GHz frequency range (e.g., less than 1 GHz), supporting large number of CSI-RS antenna ports (e.g., 32) at one site or remote radio head (RRH) or TRP is challenging due to larger antenna form factors at these frequencies (when compared with a system operating at a higher frequency such as 2 GHz or 4 GHz. At such low frequencies, the maximum number of CSI-RS antenna ports that can be co-located at a site (or RRH or TRP) can be limited, for example to 8. This limits the spectral efficiency of such systems. In particular, the MU-MIMO spatial multiplexing gains offered due to large number of CSI-RS antenna ports (such as 32) can't be achieved. One way to operate a sub-1 GHz system with large number of CSI-RS antenna ports is based on distributing antenna ports at multiple sites (or RRHs). The multiple sites or RRHs can still be connected to a single (common) baseband unit, hence the signal transmitted/received via multiple distributed RRHs can still be processed at a centralized location. For example, 32 CSI-RS ports can be distributed across 4 RRHs, each with 8 antenna ports. Such a MIMO system can be referred to as a distributed MIMO (D-MIMO) or a CJT system. An example is illustrated in FIG. 11.

Various embodiments of the present disclosure recognize that the multiple RRHs in a D-MIMO setup can be utilized for spatial multiplexing gain (based on CSI reporting). Since RRHs are geographically separated, they (RRHs) tend to contribute differently in CSI reporting. This motivates a dynamic RRH selection followed by CSI reporting condition on the RRH selection. The present disclosure provides example embodiments on how channel and interference signal can be measured under different RRH selection hypotheses. Additionally, the signaling details of such a CSI reporting and CSI-RS measurement are also provided.

Figure 12:
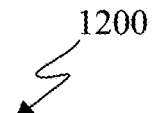
FIG. 12 illustrates channel measurement with and without Doppler components according to embodiments of the present disclosure.
Figure 12:
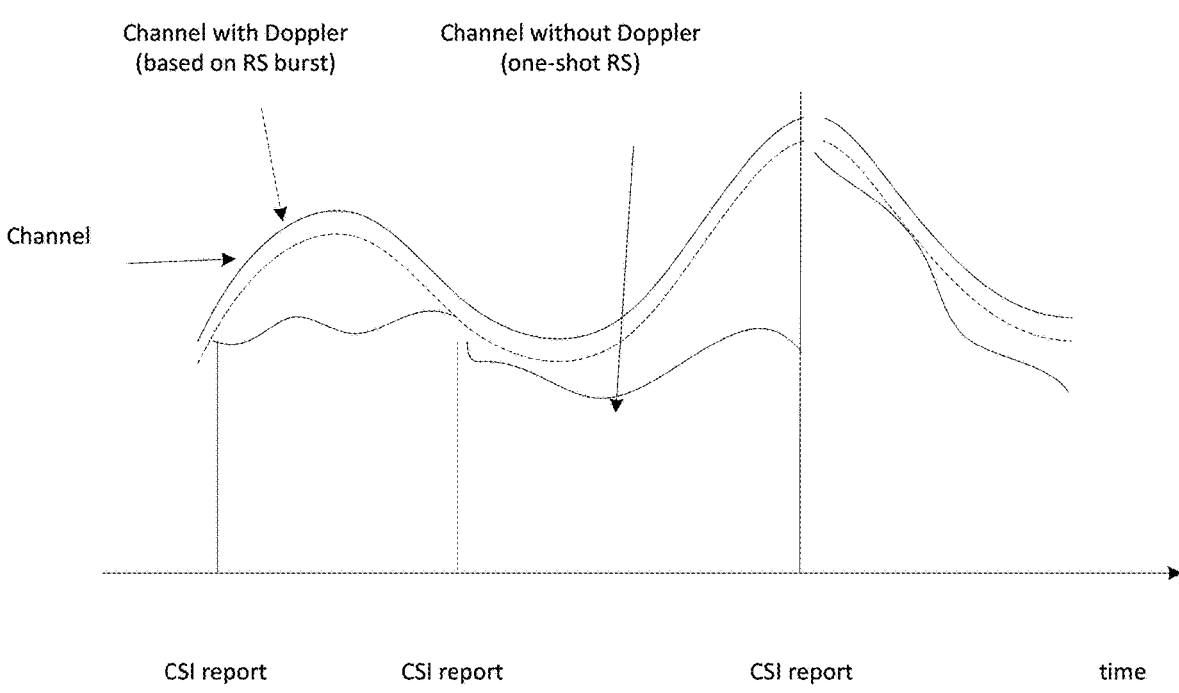

FIG. 12 illustrates channel measurement with and without Doppler components 1200 according to embodiments of the present disclosure. The embodiment of the channel measurement with and without Doppler components 1200 illustrated in FIG. 12 is for illustration only. FIG. 12 does not limit the scope of this disclosure to any particular implementation of the channel measurement with and without Doppler components.

The main use case or scenario of interest for time-/Doppler-domain compression is moderate to high mobility scenarios. When the UE speed is in a moderate or high-speed regime, the performance of the Rel. 15/16/17 codebooks starts to deteriorate quickly due to fast channel variations (which in turn is due to UE mobility that contributes to the Doppler component of the channel), and a one-shot nature of CSI-RS measurement and CSI reporting in Rel. 15/16/17. This limits the usefulness of Rel. 15/16/17 codebooks to low mobility or static UEs only. For moderate or high mobility scenarios, an enhancement in CSI-RS measurement and CSI reporting is needed, which is based on the Doppler compo-nents of the channel. As described in [REF9], the Doppler components of the channel remain almost constant over a large time duration, referred to as channel stationarity time, which is significantly larger than the channel coherence time. Note that the current (Rel. 15/16/17) CSI reporting is based on the channel coherence time, which is not suitable when the channel has significant Doppler components. The Doppler components of the channel can be calculated based on measuring a reference signal (RS) burst, where the RS can be CSI-RS or SRS. When the RS is CSI-RS, the UE measures a CSI-RS burst, and use it to obtain Doppler components of the DL channel, and when RS is SRS, the gNB measures an SRS burst, and use it to obtain Doppler components of the UL channel. The obtained Doppler com-ponents can be reported by the UE using a codebook (as part of a CS report). Alternatively, the gNB can use the obtained Doppler components of the UL channel to beamform CSI-RS for CSI reporting by the UE. An illustration of channel measurement with and without Doppler components is shown in FIG. 12. When the channel is measured with the Doppler components (e.g., based on an RS burst), the measured channel can remain close to the actual varying channel. On the other hand, when the channel is measured without the Doppler components (e.g., based on a one-shot RS), the measured channel can be far from the actual varying channel.

Various embodiments of the present disclosure relate to CSI acquisition at the gNB. In particular, various embodi-ments relate to the CSI reporting based on a high-resolution (or Type II) codebook comprising spatial-, frequency- and time- (Doppler-) domain components for a distributed antenna structure (D-MIMO). Accordingly, various embodi-ments of the present disclosure provide decoupled CSI reporting—one CSI report for SD and/or FD components, and another CSI report for TD/DD components. In addition, various embodiments of the present disclosure provide examples of inter-dependence, triggering, etc. for the two CSI reports. Further, various embodiments of the present disclosure provide SVD based compression to report W2 (with and without TD/DD basis). In addition, various embodiments of the present disclosure provide multiple SP CSI-RS resources for measuring multiple CSI-RS bursts (e.g., based on UE speeds). Further, various embodiments of the present disclosure provide configuration via one CSI-RS resource set or via multiple sets. Further still, various embodiments of the present disclosure provide extension to multiple TRPs.

All the following components and embodiments are appli-cable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodi-ments are applicable for UL transmission when the sched-uling unit in time is either one subframe (which can consist of one or multiple slots) or one slot.

In the present disclosure, the frequency resolution (report-ing granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC sig-naling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with $n \leq N$ CSI reporting bands. For instance, >6 GHz, large system band-width may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI param-eter is configured with "subband" for the CSI reporting band with M, subbands when one CSI parameter is reported for each of the M, subbands within the CSI reporting band.

Figure 13:
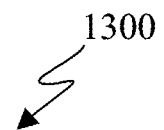
FIG. 13 illustrates an example antenna port layout according to embodiments of the present disclosure.
Figure 13:
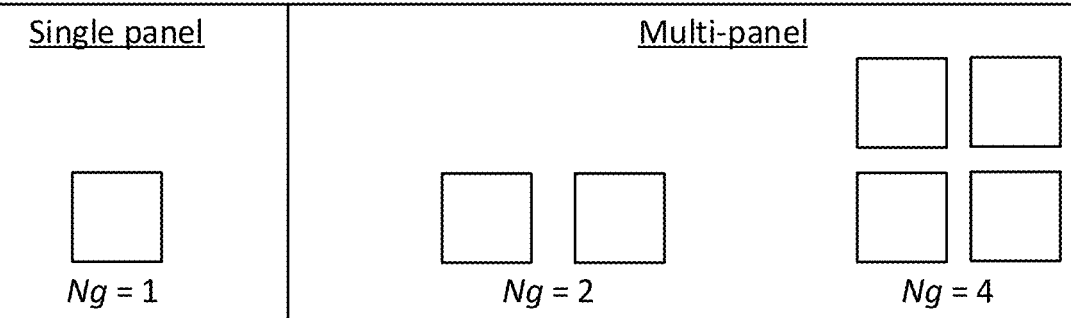

FIG. 13 illustrates an example antenna port layout 1300 according to embodiments of the present disclosure. The embodiment of the antenna port layout 1300 illustrated in FIG. 13 is for illustration only. FIG. 13 does not limit the scope of this disclosure to any particular implementation of the antenna port layout.

As illustrated in FIG. 13, $N_1$ and $N_2$ are the number of antenna ports with the same polarization in the first and second dimensions, respectively. For 2D antenna port lay-outs, $N_1>1$, $N_2>1$, and for 1D antenna port layouts $N_1>1$ and $N_2=1$. Therefore, for a dual-polarized antenna port layout, the total number of antenna ports is $2N_1N_2$ when each antenna maps to an antenna port. An illustration is shown in FIG. 13 where "X" represents two antenna polarizations. In this disclosure, the term "polarization" refers to a group of antenna ports. For example, antenna ports $$j = X + 0, X + 1, \dots, X + \frac{P_{CSIRS}}{2} - 1$$

comprise a first antenna polarization, and antenna ports $$j = X + \frac{P_{CSIRS}}{2}, X + \frac{P_{CSIRS}}{2} + 1, \dots, X + P_{CSIRS} - 1$$

comprise a second antenna polarization, where $P_{CSIRS}$ is a number of CSI-RS antenna ports and X is a starting antenna port number (e.g., X=3000, then antenna ports are 3000, 3001, 3002, ... ). Let $N_g$ be a number of antenna panels at the gNB. When there are multiple antenna panels ($N_g > 1$), we assume that each panel is dual-polarized antenna ports with $N_1$ and $N_2$ ports in two dimensions. This is illustrated in FIG. 13. Note that the antenna port layouts may or may not be the same in different antenna panels.

In one example, the antenna architecture of a D-MIMO or CJT system is structured. For example, the antenna structure at each RRH (or TRP) is dual-polarized (single or multi-panel as shown in FIG. 13. The antenna structure at each RRH/TRP can be the same. Alternatively, the antenna structure at an RRH/TRP can be different from another RRH/TRP. Likewise, the number of ports at each RRH/TRP can be the same. Alternatively, the number of ports at one RRH/TRP can be different from another RRH/TRP. In one example, $N_g = N_{RRH}$, a number of RRHs/TRPs in the D-MIMO transmission.

In another example, the antenna architecture of a D-MIMO or CJT system is unstructured. For example, the antenna structure at one RRH/TRP can be different from another RRH/TRP.

We assume a structured antenna architecture in the rest of the disclosure. For simplicity, we assume each RRH/TRP is equivalent to a panel, although, an RRH/TRP can have multiple panels in practice. The disclosure however is not restrictive to a single panel assumption at each RRH/TRP, and can easily be extended (covers) the case when an RRH/TRP has multiple antenna panels.

In one embodiment, an RRH constitutes (or corresponds to or is equivalent to) at least one of the following:

In one example, an RRH corresponds to a TRP.

In one example, an RRH or TRP corresponds to a CSI-RS resource. A UE is configured with $K = N_{RRH} > 1$ non-zero-power (NZP) CSI-RS resources, and a CSI reporting is configured to be across multiple CSI-RS resources. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure.

In one example, an RRH or TRP corresponds to a CSI-RS resource group, where a group comprises one or multiple NZP CSI-RS resources. A UE is configured with $K \geq N_{RRH} > 1$ non-zero-power (NZP) CSI-RS resources, and a CSI reporting is configured to be across multiple CSI-RS resources from resource groups. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure. In particular, the K CSI-RS resources can be partitioned into $N_{RRH}$ resource groups. The information about the resource grouping can be provided together with the CSI-RS resource setting/configuration, or with the CSI reporting setting/configuration, or with the CSI-RS resource configuration.

In one example, an RRH or TRP corresponds to a subset (or a group) of CSI-RS ports. A UE is configured with at least one NZP CSI-RS resource comprising (or associated with) CSI-RS ports that can be grouped (or partitioned) multiple subsets/groups/parts of antenna ports, each corresponding to (or constituting) an RRH/TRP. The information about the subsets of ports or grouping of ports can be provided together with the CSI-RS resource setting/configuration, or with the CSI reporting setting/configuration, or with the CSI-RS resource configuration.

In one example, an RRH or TRP corresponds to one or more examples described above depending on a configuration. For example, this configuration can be explicit via a parameter (e.g., an RRC parameter). Alternatively, it can be implicit.

In one example, when implicit, it could be based on the value of K. For example, when K>1 CSI-RS resources, an RRH corresponds to one or more examples described above, and when K=1 CSI-RS resource, an RRH corresponds to one or more examples described above.

In another example, the configuration could be based on the configured codebook. For example, an RRH corresponds to a CSI-RS resource or resource group when the codebook corresponds to a decoupled codebook (modular or separate codebook for each RRH), and an RRH corresponds to a subset (or a group) of CSI-RS ports when codebook corresponds to a coupled (joint or coherent) codebook (one joint codebook across RRHs).

In one example, when RRH or TRP maps (or corresponds to) a CSI-RS resource or resource group, and a UE can select a subset of RRHs (resources or resource groups) and report the CSI for the selected RRHs (resources or resource groups), the selected RRHs can be reported via an indicator. For example, the indicator can be a CRI or a PMI (component) or a new indicator.

In one example, when RRH maps (or corresponds to) a CSI-RS port group, and a UE can select a subset of RRHs (port groups) and report the CSI for the selected RRHs (port groups), the selected RRHs can be reported via an indicator. For example, the indicator can be a CRI or a PMI (component) or a new indicator.

In one example, when multiple (K>1) CSI-RS resources are configured for $N_{RRH}$ RRHs, a decoupled (modular) codebook is used/configured, and when a single (K=1) CSI-RS resource for $N_{RRH}$ RRHs, a joint codebook is used/configured.

As described in U.S. Pat. No. 10,659,118, issued May 19, 2020, and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination-based Type II CSI reporting framework is extended to include a frequency dimension in addition to the first and second antenna port dimensions.

Figure 14:
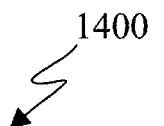
FIG. 14 illustrates a 3D grid of oversampled discrete Fourier transform (DFT) beams according to embodiments of the present disclosure.

FIG. 14 illustrates a 3D grid of oversampled DFT beams 1400 according to embodiments of the present disclosure. The embodiment of the 3D grid of oversampled DFT beams 1400 illustrated in FIG. 14 is for illustration only. FIG. 14 does not limit the scope of this disclosure to any particular implementation of the 3D grid of oversampled DFT beams.

As illustrated, FIG. 14 shows a 3D grid 1400 of the oversampled DFT beams (1st port dim., 2nd port dim., freq. dim.) in which

- a 1st dimension is associated with the 1st port dimension,
- a 2nd dimension is associated with the 2nd port dimension, and
- a 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In one example, $O_1=O_2=4$ and $O_3=1$. In another example, the oversampling factors $O$ belongs to $\{2, 4, 8\}$. In yet another example, at least one of $O_1$, $O_2$, and $O_3$ is higher layer configured (via RRC signaling).

As explained in Section 5.2.2.2.6 of REF8, a UE is configured with higher layer parameter codebookType set to 'typeII-PortSelection-r16' for an enhanced Type II CSI reporting in which the pre-coders for all SBs and for a given layer l=1, . . . , v, where v is the associated RI value, is given by either $$W^l = AC_lB^H =$$

$$[a_0 \; a_1 \; \ldots \; a_{L-1}] \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 \; b_1 \; \ldots \; b_{M-1}]^H$$

$$= \sum_{f=0}^{M-1}\sum_{i=0}^{L-1} c_{l,i,f}\left(a_i b_f^H\right) = \sum_{i=0}^{L-1}\sum_{f=0}^{M-1} c_{l,i,f}\left(a_i b_f^H\right), \text{ or} \quad \text{(Eq. 2)}$$

$$W^l = \begin{bmatrix} A & 0 \\ 0 & A \end{bmatrix} C_l$$

$$B^H = \begin{bmatrix} a_0 a_1 \ldots a_{L-1} & 0 \\ 0 & a_0 a_1 \ldots a_{L-1} \end{bmatrix} \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix}$$

$$[b_0 \; b_1 \; \ldots \; b_{M-1}]^H = \begin{bmatrix} \sum_{f=0}^{M-1}\sum_{i=0}^{L-1} c_{l,i,f}\left(a_i b_f^H\right) \\ \sum_{f=0}^{M-1}\sum_{i=0}^{L-1} c_{l,i+L,f}\left(a_i b_f^H\right) \end{bmatrix},$$

where:

- $N_1$ is a number of antenna ports in a first antenna port dimension (having the same antenna polarization),
- $N_2$ is a number of antenna ports in a second antenna port dimension (having the same antenna polarization),
- $P_{CSI\text{-}RS}$ is a number of CSI-RS ports configured to the UE,
- $N_3$ is a number of SBs for PMI reporting or number of FD units or number of FD components (that comprise the CSI reporting band) or a total number of precoding matrices indicated by the PMI (one for each FD unit/component),
- $a_i$ is a $2N_1N_2\times1$ (Eq. 1) or $N_1N_2\times1$ (Eq. 2) column vector, or $a_i$ is a $P_{CSIRS}\times1$ (Eq. 1) or $$\frac{P_{CSIRS}}{2}\times1$$

port selection column vector, where a port selection vector is a defined as a vector which contains a value of 1 in one element and zeros elsewhere,

- $b_f$ is a $N_3\times1$ column vector,
- $c_{l,i,f}$ is a complex coefficient.

In a variation, when the UE reports a subset K<2LM coefficients (where K is either fixed, configured by the gNB or reported by the UE), then the coefficient $c_{l,i,f}$ in precoder equations Eq. 1 or Eq. 2 is replaced with $x_{l,i,f} \times c_{l,i,f}$, where:

$x_{l,i,f}=1$ if the coefficient $c_{l,i,f}$ is reported by the UE according to some embodiments of this disclosure.

$x_{l,i,f}=0$ otherwise (i.e., $c_{l,i,f}$ is not reported by the UE).

The indication whether $x_{l,i,f}=1$ or 0 is according to some embodiments of this disclosure. For example, it can be via a bitmap.

In a variation, the precoder equations Eq. 1 or Eq. 2 are respectively generalized to $$W^l = \sum_{i=0}^{L-1}\sum_{f=0}^{M_i-1} c_{l,i,f}\left(a_i b_{i,f}^H\right) \text{ and} \quad \text{(Eq. 3)}$$

$$W^l = \begin{bmatrix} \sum_{i=0}^{L-1}\sum_{f=0}^{M_i-1} c_{l,i,f}\left(a_i b_{i,f}^H\right) \\ \sum_{i=0}^{L-1}\sum_{=0}^{M_i-1} c_{l,i+L,f}\left(a_i b_{i,f}^H\right) \end{bmatrix}, \quad \text{(Eq. 4)}$$

where for a given i, the number of basis vectors is $M_i$ and the corresponding basis vectors are $\{b_{i,f}\}$. Note that $M_i$ is the number of coefficients $c_{l,i,f}$ reported by the UE for a given i, where $M_i \leq M$ (where $\{M_i\}$ or $\Sigma M_i$ is either fixed, configured by the gNB or reported by the UE). The columns of $W^l$ are normalized to norm one. For rank R or R layers (v=R), the pre-coding matrix is given by $$W^{(R)} = \frac{1}{\sqrt{R}}\begin{bmatrix} W^1 & W^2 & \cdots & W^R \end{bmatrix}.$$

Eq. 2 is assumed in the rest of the disclosure. The embodiments of the disclosure, however, are general and are also application to Eq. 1, Eq. 3 and Eq. 4.

Here $$L \geq \frac{P_{CSI\text{-}RS}}{2} \text{ and } M \leq N_3. \text{ If } L = \frac{P_{CSI\text{-}RS}}{2},$$

then A is an identity matrix, and hence not reported. Likewise, if $M=N_3$, then B is an identity matrix, and hence not reported. Assuming $M<N_3$, in an example, to report columns of B, the oversampled DFT codebook is used. For instance, $b_f=w_f$, where the quantity $w_f$ is given by $$w_f = \begin{bmatrix} 1 & e^{j\frac{2\pi n_{3,l}^{(f)}}{O_3 N_3}} & e^{j\frac{2\pi \cdot 2n_{3,l}^{(f)}}{O_3 N_3}} & \cdots & e^{j\frac{2\pi (N_3-1)n_{3,l}^{(f)}}{O_3 N_3}} \end{bmatrix}^T.$$

When $O_3=1$, the FD basis vector for layer $l \in \{1, \ldots, v\}$ (where v is the RI or rank value) is given by $$w_f = \begin{bmatrix} y_{0,l}^{(f)} & y_{1,l}^{(f)} & \cdots & y_{N_3-1,l}^{(f)} \end{bmatrix}^T, \text{ where}$$

$$y_{t,l}^{(f)} = e^{j\frac{2\pi t n_{3,l}^{(f)}}{N_3}} \text{ and } n_{3,l} = \begin{bmatrix} n_{3,l}^{(0)}, \ldots, n_{3,l}^{(M-1)} \end{bmatrix} \text{ where}$$

-continued $$n_{3,l}^{(f)} \in \{0, 1, \ldots, N_3 - 1\}.$$

In another example, discrete cosine transform DCT basis is used to construct/report basis B for the $3^{rd}$ dimension. The m-th column of the DCT compression matrix is simply given by $$[W_f]_{nm} = \begin{cases} \dfrac{1}{\sqrt{K}}, & n = 0 \\ \sqrt{\dfrac{2}{K}} \cos\dfrac{\pi(2m+1)n}{2K}, & n = 1, \ldots K-1 \end{cases}, \text{ and }$$

$$K = N_3, \text{ and } m = 0, \ldots, N_3 - 1.$$

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

On a high level, a precoder $W^l$ can be described as follows.

$$W = A_l C_l B_l^H = W_1 \tilde{W}_2 W_f^H, \tag{Eq. 5}$$

where $A = W_1$ corresponds to the Rel. 15 $W_1$ in Type II CSI codebook [REF8], and $B = W_f$.

The $C_l = \tilde{W}_2$ matrix consists of all the required linear combination coefficients (e.g., amplitude and phase or real or imaginary). Each reported coefficient ($c_{l,i,f} = p_{l,i,f} \phi_{l,i,f}$) in $\tilde{W}_2$ is quantized as amplitude coefficient ($p_{l,i,f}$) and phase coefficient ($\phi_{l,i,f}$). In one example, the amplitude coefficient ($p_{l,i,f}$) is reported using a A-bit amplitude codebook where A belongs to $\{2, 3, 4\}$. If multiple values for A are supported, then one value is configured via higher layer signaling. In another example, the amplitude coefficient ($p_{l,i,f}$) is reported as $p_{l,i,f} = p_{l,i,f}^{(1)} p_{l,i,f}^{(2)}$ where $p_{l,i,f}^{(1)}$ is a reference or first amplitude which is reported using a A1-bit amplitude codebook where A1 belongs to $\{2, 3, 4\}$, and $p_{l,i,f}^{(2)}$ is a differential or second amplitude which is reported using a A2-bit amplitude codebook where A2≤A1 belongs to $\{2, 3, 4\}$.

For layer l, let us denote the linear combination (LC) coefficient associated with spatial domain (SD) basis vector (or beam) $i \in \{0, 1, \ldots, 2L-1\}$ and frequency domain (FD) basis vector (or beam) $f \in \{0, 1, \ldots, M-1\}$ as $c_{l,i,f}$ and the strongest coefficient as $c_{l,i^*,f^*}$. The strongest coefficient is reported out of the $K_{NZ}$ non-zero (NZ) coefficients that is reported using a bitmap, where $K_{NZ} \le K_0 = \lceil \beta \times 2LM \rceil < 2LM$ and $\beta$ is higher layer configured. The remaining $2LM - K_{NZ}$ coefficients that are not reported by the UE are assumed to be zero. The following quantization scheme is used to quantize/report the $K_{NZ}$ NZ coefficients.

UE reports the following for the quantization of the NZ coefficients in $\tilde{W}_2$ A X-bit indicator for the strongest coefficient index (i*,f*), where $X = \lceil \log_2 K_{NZ} \rceil$ or $\lceil \log_2 2L \rceil$.

i. Strongest coefficient $c_{l,i^*,f^*} = 1$ (hence its amplitude/phase are not reported)

Two antenna polarization-specific reference amplitudes is used.

i. For the polarization associated with the strongest coefficient $c_{l,i^*,f^*} = 1$, since the reference amplitude $p_{l,i,f}^{(1)} >= 1$, it is not reported ii. For the other polarization, reference amplitude $p_{l,i,f}^{(1)}$ is quantized to 4 bits 1. The 4-bit amplitude alphabet is $$\left\{ 1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}} \right\}.$$

For $\{c_{l,i,f}, (i,f) \neq (i^*, f^*)\}$:

i. For each polarization, differential amplitudes $p_{l,i,f}^{(2)}$ of the coefficients calculated relative to the associated polarization-specific reference amplitude and quantized to 3 bits 1. The 3-bit amplitude alphabet is $$\left\{ 1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}} \right\}.$$

2. Note: The final quantized amplitude $p_{l,i,f}$ is given by $p_{l,i,f}^{(1)} \times p_{l,i,f}^{(2)}$ ii. Each phase is quantized to either 8PSK ($N_{ph}=8$) or 16PSK ($N_{ph}=16$) (which is configurable).

For the polarization $r^* \in \{0,1\}$ associated with the strongest coefficient $c_{i,i^*,f^*}$, we have $$r^* = \left\lfloor \frac{i^*}{L} \right\rfloor$$

and the reference amplitude $p_{l,i,f}^{(1)} = p_{l,r^*}^{(1)} = 1$. For the other polarization $r \in \{0,1\}$ and $r \neq r^*$, we have $$r = \left( \left\lfloor \frac{i^*}{L} \right\rfloor + 1 \right)$$

mod 2 and the reference amplitude $p_{l,i,f}^{(1)} = p_{l,r}^{(1)}$ is quantized (reported) using the 4-bit amplitude codebook mentioned above.

In Rel. 16 enhanced Type II and Type II port selection codebooks, a UE can be configured to report M FD basis vectors. In one example, $$M = \left\lceil p \times \frac{N_3}{R} \right\rceil,$$

where R is higher-layer configured from $\{1,2\}$ and p is higher-layer configured from $\{1/4, 1/2\}$. In one example, the p value is higher-layer configured for rank 1-2 CSI reporting. For rank >2 (e.g., rank 3-4), the p value (denoted by $v_0$) can be different. In one example, for rank 1-4, (p, $v_0$) is jointly configured from $$\left\{ \frac{1}{2}, \frac{1}{4} \right\}, \left( \frac{1}{4}, \frac{1}{4} \right), \left( \frac{1}{4}, \frac{1}{8} \right) \right\}, \text{ i.e., } M = \left\lceil p \times \frac{N_3}{R} \right\rceil \text{ for rank 1-2}$$

$$\text{and } M = \left\lceil v_0 \times \frac{N_3}{R} \right\rceil$$

rank 3-4. In one example, $N_3=N_{SB}\times R$ where $N_{SB}$ is the number of SBs for CQI reporting. In one example, M is replaced with $M_v$ to show its dependence on the rank value v, hence p is replaced with $p_v$, $v\in\{1,2\}$ and $v_0$ is replaced with $p_v$, $v\in\{3,4\}$.

A UE can be configured to report $M_v$ FD basis vectors in one-step from $N_3$ basis vectors freely (independently) for each layer $l\in\{1, \ldots, v\}$ of a rank v CSI reporting. Alternatively, a UE can be configured to report $M_v$ FD basis vectors in two-step as follows.

In step 1, an intermediate set (InS) comprising $N_3'<N_3$ basis vectors is selected/reported, wherein the InS is common for all layers.

In step 2, for each layer $l\in\{1, \ldots, v\}$ of a rank v CSI reporting, $M_v$ FD basis vectors are selected/reported freely (independently) from $N_3'$ basis vectors in the InS.

In one example, one-step method is used when $N_3\leq19$ and two-step method is used when $N_3>19$. In one example, $N_3'=\lceil\alpha M_v\rceil$ where $\alpha>1$ is either fixed (to 2 for example) or configurable.

The codebook parameters used in the DFT based frequency domain compression (Eq. 5) are (L, $p_v$ for $v\in\{1,2\}$, $p_v$ for $v\in\{3,4\}$, $\beta$, $\alpha$, $N_{ph}$). The set of values for these codebook parameters are as follows.

L: the set of values is {2,4} in general, except $L\in\{2,4,6\}$ for rank 1-2, 32 CSI-RS antenna ports, and R=1.

($p_v$ for $v\in\{1,2\}$, $p_v$ for $v\in\{(\frac{1}{2},\frac{1}{4}),(\frac{1}{4},\frac{1}{4}),(\frac{1}{4},\frac{1}{8})\}$.

$\beta\in\{\frac{1}{4},\frac{1}{2},\frac{3}{4}\}$.

$\alpha=2$ $N_{ph}=16$.

The set of values for these codebook parameters are as in Table 1.

TABLE 1

| paramCombination | L | $P_v$ | | $\beta$ |
|---|---|---|---|---|
| | | $v\in\{1,2\}$ | $v\in\{3,4\}$ | |
| 1 | 2 | $\frac{1}{4}$ | $\frac{1}{8}$ | $\frac{1}{4}$ |
| 2 | 2 | $\frac{1}{4}$ | $\frac{1}{8}$ | $\frac{1}{2}$ |
| 3 | 4 | $\frac{1}{4}$ | $\frac{1}{8}$ | $\frac{1}{4}$ |
| 4 | 4 | $\frac{1}{4}$ | $\frac{1}{8}$ | $\frac{1}{2}$ |
| 5 | 4 | $\frac{1}{4}$ | $\frac{1}{4}$ | $\frac{3}{4}$ |
| 6 | 4 | $\frac{1}{2}$ | $\frac{1}{4}$ | $\frac{1}{2}$ |
| 7 | 6 | $\frac{1}{4}$ | — | $\frac{1}{2}$ |
| 8 | 6 | $\frac{1}{4}$ | — | $\frac{3}{4}$ |

In Rel. 17 (further enhanced Type II port selecting codebook), $$M \in \{1,2\}, L = \frac{K_1}{2}$$

where $K_1=\alpha\times P_{CSIRS}$, and codebook parameters (M, $\alpha$, $\beta$) are configured from Table 2.

TABLE 2

| paramCombination-r17 | M | $\alpha$ | $\beta$ |
|---|---|---|---|
| 1 | 1 | $\frac{3}{4}$ | $\frac{1}{2}$ |
| 2 | 1 | 1 | $\frac{1}{2}$ |
| 3 | 1 | 1 | $\frac{3}{4}$ |
| 4 | 1 | 1 | 1 |

TABLE 2-continued

| paramCombination-r17 | M | $\alpha$ | $\beta$ |
|---|---|---|---|
| 5 | 2 | $\frac{1}{2}$ | $\frac{1}{2}$ |
| 6 | 2 | $\frac{3}{4}$ | $\frac{1}{2}$ |
| 7 | 2 | 1 | $\frac{1}{2}$ |
| 8 | 2 | 1 | $\frac{3}{4}$ |

The above-mentioned framework (Eq. 5) represents the precoding-matrices for multiple ($N_3$) FD units using a linear combination (double sum) over 2L (or $K_1$) SD beams/ports and $M_v$ FD beams. This framework can also be used to represent the precoding-matrices in time domain (TD) by replacing the FD basis matrix $W_f$ with a TD basis matrix $W_t$, wherein the columns of $W_t$ comprises $M_v$ TD beams that represent some form of delays or channel tap locations. Hence, a precoder $W^t$ can be described as follows.

$$W=A_lC_lB_l^{tH}=W_1\tilde{W}_2W_t^H,\qquad\text{(Eq. 5A)}$$

In one example, the $M_v$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

The remainder of the present disclosure is applicable to both space-frequency (Eq. 5) and space-time (Eq. 5A) frameworks.

In this disclosure, the abovementioned framework for CSI reporting based on space-frequency compression (Eq. 5) or space-time compression (Eq. 5A) frameworks can be extended in two directions:

time or Doppler domain compression (e.g., for moderate to high mobility UEs) and joint transmission across multiple RRHs/TRP (e.g., for a D-MIMO or multiple TRP systems).

Figure 15:
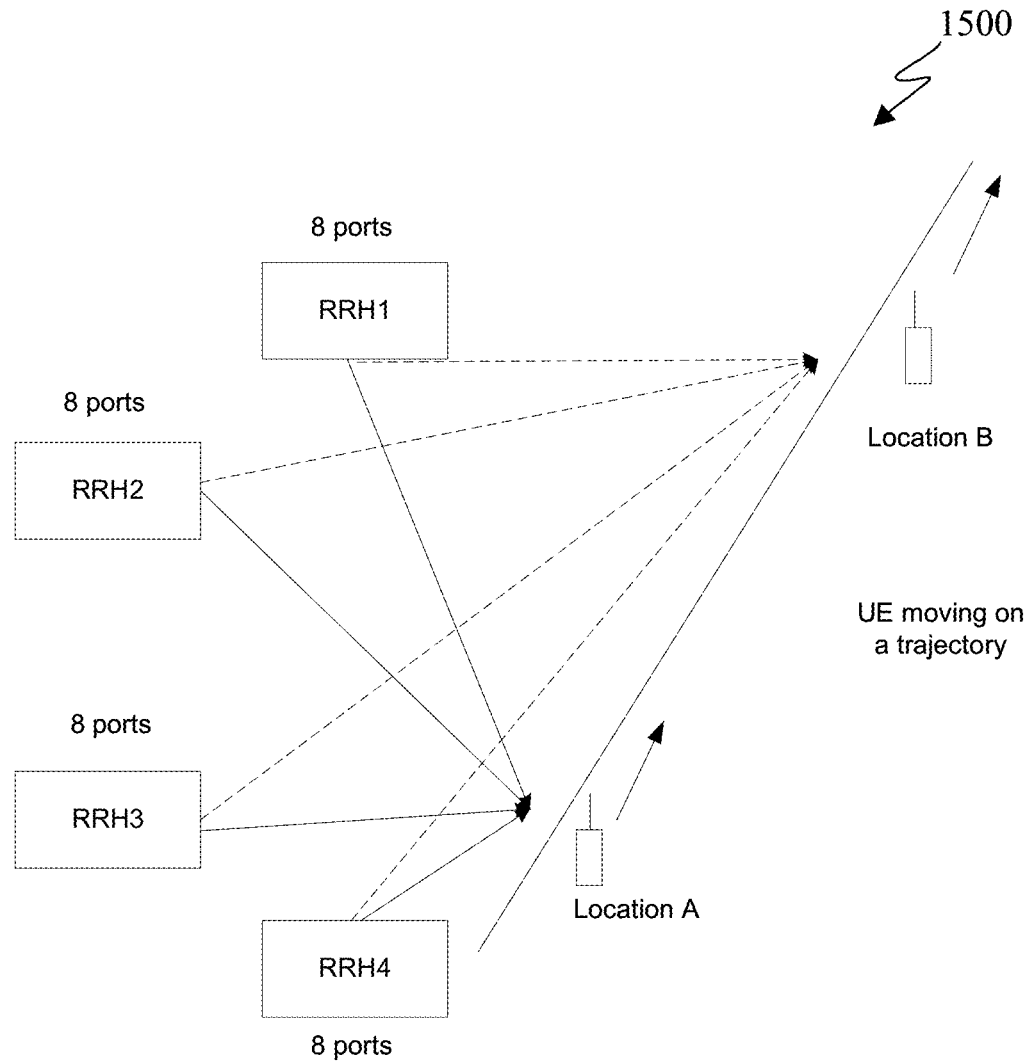
FIG. 15 illustrates a UE moving on a linear trajectory in a distributed MIMO (D-MIMO) system according to embodiments of the present disclosure.

FIG. 15 illustrates a UE moving on a linear trajectory in a D-MIMO system 1500 according to embodiments of the present disclosure. The embodiment of the UE moving on a linear trajectory in a D-MIMO system 1500 illustrated in FIG. 15 is for illustration only. FIG. 15 does not limit the scope of this disclosure to any particular implementation of the UE moving on a linear trajectory in a D-MIMO system.

While the UE moves from a location A to another location B at high speed (e.g., 60 kmph), the UE measures the channel and the interference (e.g., via NZP CSI-RS resources and CSI-IM resources, respectively), uses them to determine/report CSI considering CJT from multiple RRHs. The reported CSI can be based on a codebook, which includes components considering both multiple RRHs, and time-/Doppler-domain channel compression.

Figure 16:
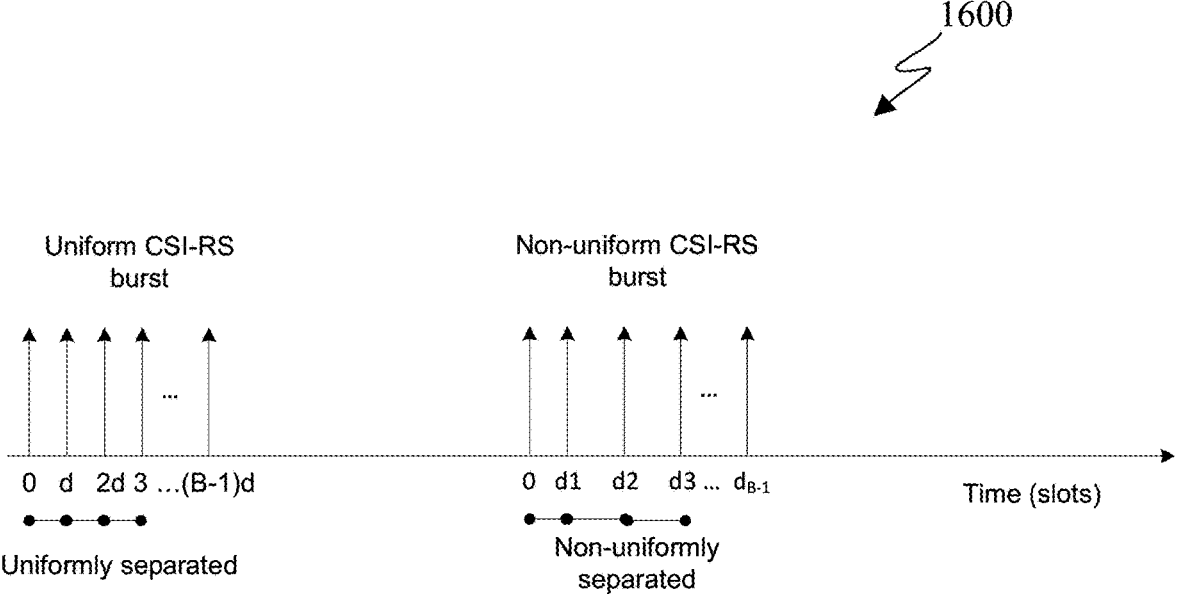
FIG. 16 illustrates an example of a UE configured to receive a burst of non-zero power (NZP) CSI-RS resource(s) according to embodiments of the present disclosure.

FIG. 16 illustrates an example of a UE configured to receive a burst of non-zero power (NZP) CSI-RS resource(s) 1600 according to embodiments of the present disclosure. The embodiment of the example of a UE configured to receive a burst of non-zero power (NZP) CSI-RS resource(s) 1600 illustrated in FIG. 16 is for illustration only. FIG. 16 does not limit the scope of this disclosure to any particular implementation of the example of a UE configured to receive a burst of non-zero power (NZP) CSI-RS resource (s).

In one embodiment, as shown in FIG. 16, a UE is configured to receive a burst of non-zero power (NZP) CSI-RS resource(s), referred to as CSI-RS burst for brevity, within B time slots comprising a measurement window, where B≥1. The B time slots can be accordingly to at least one of the following examples.

In one example, the B time slots are evenly/uniformly spaced with an inter-slot spacing d.

In one example, the B time slots can be non-uniformly spaced with inter-slot spacing $e_1 = d_1$, $e_2 = d_2 - d_1$, $e_3 = d_3 - d_2$, . . . so on, where $e_i \neq e_j$ for at least one pair (i,j) with i≠j.

The UE receives the CSI-RS burst, estimates the B instances of the DL channel measurements, and uses the channel estimates to obtain the Doppler component(s) of the DL channel. The CSI-RS burst can be linked to (or associated with) a single CSI reporting setting (e.g., via higher layer parameter CSI-ReportConfig), wherein the corresponding CSI report includes an information about the Doppler component(s) of the DL channel.

Let $h_t$ be the DL channel estimate based on the CSI-RS resource(s) received in time slot t∈{0,1, . . . , B−1}. When the DL channel estimate in slot t is a matrix $G_t$ of size $N_{Rx} \times N_{Tx} \times N_{Sc}$, then $h_t = vec(G_t)$, where $N_{Rx}$, $N_{Tx}$, and $N_{Sc}$ are number of receive (Rx) antennae at the UE, number of CSI-RS ports measured by the UE, and number of subcarriers in frequency band of the CSI-RS burst, respectively. The notation vec(X) is used to denote the vectorization operation wherein the matrix X is transformed into a vector by concatenating the elements of the matrix in an order, for example, 1→2→3→ and so on, implying that the concatenation starts from the first dimension, then moves second dimension, and continues until the last dimension. Let $H_B = [h_0\ h_1\ .\ .\ .\ h_{B-1}]$ be a concatenated DL channel. The Doppler component(s) of the DL channel can be obtained based on $H_B$. For example, $H_B$ can be represented as $C\Phi^H = \Sigma_{s=0}^{N-1} c_s \phi_s^G$ where $\Phi = [\phi_0\ \phi_1\ .\ .\ .\ \phi_{N-1}]$ is a Doppler domain (DD) basis matrix whose columns comprise basis vectors, $C = [c_0\ c_1\ .\ .\ .\ c_{N-1}]$ is a coefficient matrix whose columns comprise coefficient vectors, and N<B is the number of DD basis vectors. Since the columns of $H_B$ are likely to be correlated, a DD compression can be achieved when the value of N is small (compared to the value of B). In this example, the Doppler component(s) of the channel is represented by the DD basis matrix $\Phi$ and the coefficient matrix C.

When there are multiple TRPs/RRHs ($N_{RRH} > 1$), the UE can be configured to measure the CSI-RS burst(s) according to at least one of the following examples.

In one example, the UE is configured to measure $N_{RRH}$ CSI-RS bursts, one from each TRP/RRH. The $N_{RRH}$ CSI-RS bursts can be overlapping in time (i.e., measured in same time slots). Or, they can be staggered in time (i.e., measured in different time slots). Whether overlapping or staggered can be determined based on configuration. It can also depend on the total number of CSI-RS ports across RRHs/TRPs. When the total number of ports is small (e.g., <=32), they can overlap, otherwise (>32), they are staggered. The number of time instances B can be the same for all of the $N_{RRH}$ bursts. Or the number B can be the same or different across bursts (or TRPs/RRHs).

In one example, each CSI-RS burst corresponds to a semi-persistent (SP) CSI-RS resource. The SP CSI-RS resource can be activated and/or deactivated based on a MAC CE and/or DCI based signaling.

In one example, each CSI-RS burst corresponds to a group of B≥1 aperiodic (Ap) CSI-RS resources. The Ap-CSI-RS resources can be triggered via a DCI with slot offsets such that they can be measured in B different time slots.

In one example, each CSI-RS burst corresponds to a periodic (P) CSI-RS resource. The P-CSI-RS resource can be configured via higher layer. The first measurement instance (time slot) and the measurement window of the CSI-RS burst (from the P-CSI-RS resource) can be fixed, or configured.

In one example, a CSI-RS burst can either be a P-CSI-RS, or SP-CSI-RS or Ap-CSI-RS resource.

In one example, the time-domain behavior (P, SP, or Ap) of $N_{RRH}$ CSI-RS bursts is the same.

In one example, the time-domain behavior of $N_{RRH}$ CSI-RS bursts can be the same or different.

In one example, the UE is configured to measure $K \geq N_{RRH}$ CSI-RS bursts, where $K = \Sigma_{r=1}^{N_{RRH}} K_r$ and $K_r$ is a number of CSI-RS bursts associated with RRH/TRP or NZP CSI-RS resource r, where r∈{1, . . . , $N_{RRH}$}. Each CSI-RS burst is according to at least one of the examples in example A.1.1. When $K_r > 1$, multiple CSI-RS bursts are linked to (or associated with) a CSI reporting setting, i.e., the UE receives the $N_r$ CSI-RS bursts, estimates the DL channels, and obtains the Doppler component(s) of the channel using all of the $N_r$ CSI-RS bursts.

In one example, the UE is configured to measure one CSI-RS burst across all of $N_{RRH}$ TRPs/RRHs or NZP CSI-RS resources. Let P be a total number of CSI-RS ports associated with the NZP CSI-RS resources measured via the CSI-RS burst. The CSI-RS burst is according to at least one of the examples in example A.1.1. The total of P ports can be divided into $N_{RRH}$ groups/subsets of ports and one group/subset of ports is associated with (or corresponds to) a TRP/RRH or NZP CSI-RS resource. Then, $P = \Sigma_{r=1}^{N_{RRH}} P_r$ and $P_r$ is a number of CSI-RS ports in the group/subset of ports associated with RRH/TRP or NZP CSI-RS resource r. In one example, $$P_r = \frac{P}{N_{RRH}}.$$

In one example, $N_{RRH}$ is fixed (e.g., 2 or 4), or configured (e.g., RRC).

In one example, in each of the B time instances, a UE is configured to measure all groups/subsets of ports, i.e., in each time instance within the burst, the UE measures all of P ports (or $N_{RRH}$ groups/subsets of ports).

In one example, a UE is configured to measure subsets/groups of ports across multiple time instances, i.e., in each time instance within the burst, the UE measures a subset of P ports or a subset of groups of ports (RRHs/TRPs).

In one example, in each time instance, the UE measures only one group/subset of ports (1 TRP or NZP CSI-RS resource per time instance). In this case, $B = N_{RRH} \times C$ or $B \geq N_{RRH} \times C$, where C is a number of measurement instances for each TRP/RRH.

In one example, the UE is configured to measure one half of the port groups in a time instance, and the remaining half in another time instance.

In one example, the two time instances can be consecutive, for example, the UE measures one half of port groups in even-numbered time instances, and the remaining half in the odd-numbered time instances.

In one example, a first half of the time instances $$\left(e.g., 0,1, \dots, \frac{B}{2} - 1\right)$$

is configured to measure one half of the port groups, and the second half of the time instances $$\left(e.g., \frac{B}{2}, \dots B - 1\right)$$

is configured to measure the remaining half of the port groups.

In one example, the UE is configured to measure multiple CSI-RS bursts, where each burst is according to at least one of the examples described herein. Multiple CSI-RS bursts are linked to (or associated with) a CSI reporting setting, i.e., the UE receives multiple CSI-RS bursts, estimates the DL channels, and obtains the Doppler component(s) of the channel using all of multiple CSI-RS bursts.

Figure 17:
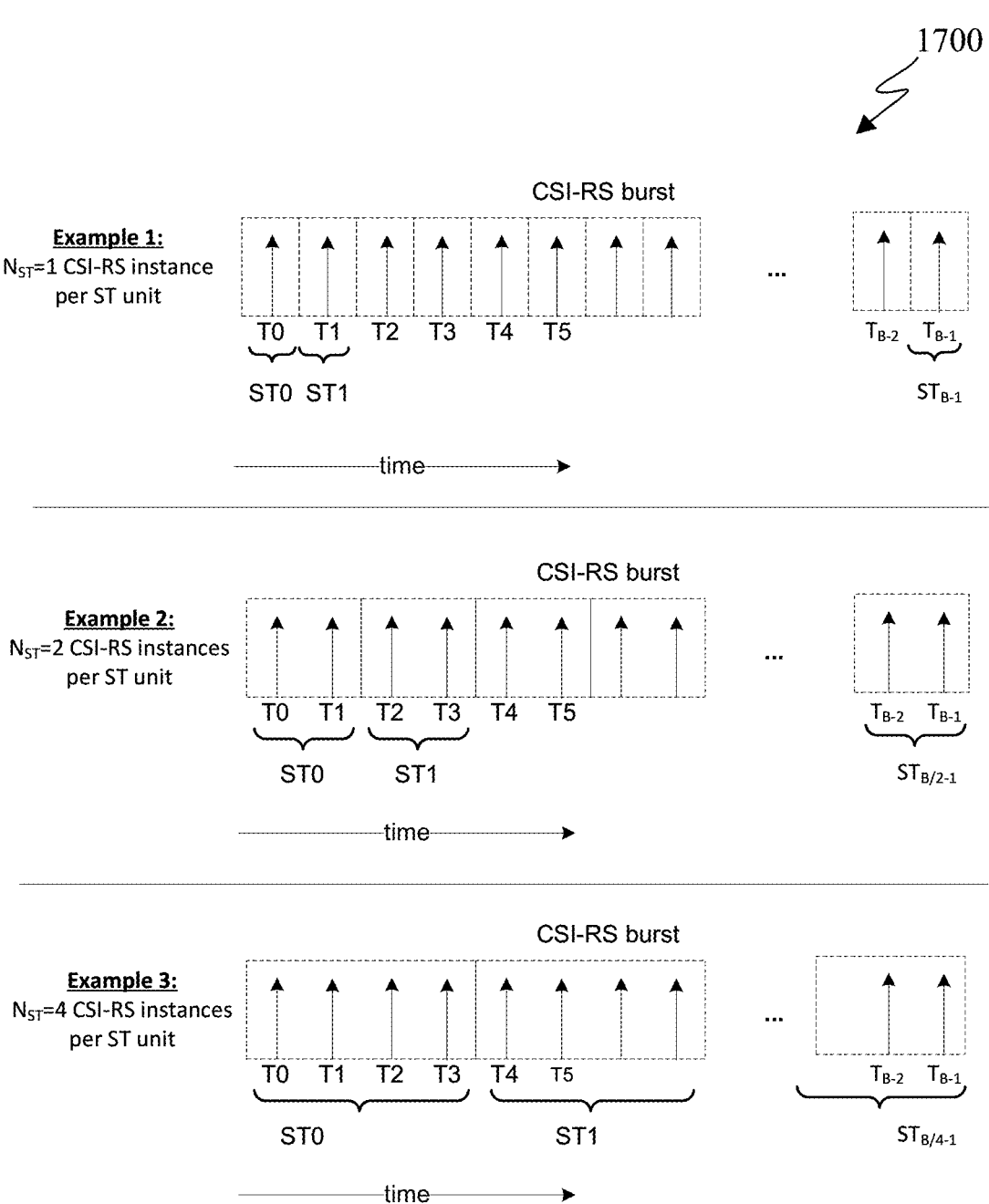
FIG. 17 illustrates an example of a UE configured to determine a value of $N_4$ based on the value B in a CSI-RS burst according to embodiments of the present disclosure.

FIG. 17 illustrates an example of a UE configured to determine a value of $N_4$ based on the value B in a CSI-RS burst 1700 according to embodiments of the present disclosure. The embodiment of the example of a UE configured to determine a value of $N_4$ based on the value B in a CSI-RS burst 1700 illustrated in FIG. 17 is for illustration only. FIG. 17 does not limit the scope of this disclosure to any particular implementation of the example of a UE configured to determine a value of $N_4$ based on the value B in a CSI-RS burst.

Let $N_4$ be the length of the DD basis vectors $\{\phi_s\}$, e.g., each basis vector is a length $N_4 \times 1$ column vector.

In one embodiment, a UE is configured to determine a value of $N_4$ based on the value B (number of CSI-RS instances) in a CSI-RS burst and components across which the DD compression is performed, where each component corresponds to one or multiple time instances within the CSI-RS burst. In one example, $N_4$ is fixed (e.g., $N_4=B$) or configured (e.g., via RRC or MAC CE or DCI) or reported by the UE (as part of the CSI report). In one example, the B CSI-RS instances can be partitioned into sub-time (ST) units (instances), where each ST unit is defined as (up to) $N_{ST}$ contiguous time instances in the CSI-RS burst. In this example, a component for the DD compression corresponds to a ST unit. Three examples of the ST units are shown in FIG. 17. In the first example, each ST unit comprises $N_{ST}=1$ time instance in the CSI-RS burst. In the second example, each ST unit comprises $N_{ST}=2$ contiguous time instances in the CSI-RS burst. In the third example, each ST unit comprises $N_{ST}=4$ contiguous time instances in the CSI-RS burst.

The value of $N_{ST}$ can be fixed (e.g., $N_{ST}=1$ or 2 or 4) or indicated to the UE (e.g., via higher layer RRC or MAC CE or DCI based signaling) or reported by the UE (e.g., as part of the CSI report). The value of $N_{ST}$ (fixed or indicated or reported) can be subject to a UE capability reporting. The value of $N_{ST}$ can also be dependent on the value of B (e.g., one value for a range of values for B and another value for another range of values for B).

When there are multiple TRPs/RRHs ($N_{RRH}$>1), the UE can be configured to determine a value of $N_4$ according to at least one of the following examples.

In one example, a value of $N_4$ is the same for all TRPs/RRHs.

In one example, a value of $N_4$ can be the same or different across TRPs/RRHs.

FIG. 18 illustrates an example of a UE configured to partition resource blocks (RBs) into subbands 1800 according to embodiments of the present disclosure. The embodiment of the example of a UE configured to partition resource blocks (RBs) into subbands 1800 illustrated in FIG. 18 is for illustration only. FIG. 18 does not limit the scope of this disclosure to any particular implementation of the example of a UE configured to partition resource blocks (RBs) into subbands.

In one embodiment, a UE is configured with J≥1 CSI-RS bursts (as illustrated earlier in the disclosure) that occupy a frequency band and a time span (duration), wherein the frequency band comprises A RBs, and the time span comprises B time instances (of CSI-RS resource(s)). When J>1, the A RBs and/or B time instances can be aggregated across J CSI-RS bursts. In one example, the frequency band equals the CSI reporting band, and the time span equals the number of CSI-RS resource instances (across J CSI-RS bursts), both can be configured to the UE for a CSI reporting, which can be based on the DD compression.

The UE is further configured to partition (divide) the A RBs into subbands (SBs) and/or the B time instances into sub-times (STs). The partition of A RBs can be based on an SB size value $N_{SB}$, which can be configured to the UE (cf. Table 5.2.1.4-2 of REF8). The partition of B time instances can be based either a ST size value $N_{ST}$ or an r value, as described in this disclosure (cf. embodiment B.1). An example is illustrated in FIG. 18, where RB0, RB1, ..., $RB_{A-1}$ comprise A RBs, $T_0$, $T_1$, ..., $T_{B-1}$ comprise B time instances, the SB size $N_{SB}=4$, and the ST size $N_{ST}=2$.

When there are multiple TRPs/RRHs ($N_{RRH}$>1), the UE can be configured to determine subbands (SBs) and/or sub-times (STs) according to at least one of the following examples.

In one example, both subbands (SBs) and/or sub-times (STs) are the same for all TRPs/RRHs.

In one example, subbands (SBs) are the same for all TRPs/RRHs, but sub-times (STs) can be the same or different across RRHs/TRPs.

In one example, subtimes (STs) are the same for all TRPs/RRHs, but subbands (SBs) can be the same or different across RRHs/TRPs.

In one example, both subtimes (STs) and subbands (SBs) can be the same or different across RRHs/TRPs.

For illustration, the example where both subbands (SBs) and/or sub-times (STs) are the same for all TRPs/RRHs is assumed in the remainder of the present disclosure.

The CSI reporting is based on channel measurements (based on CSI-RS bursts) in three-dimensions (3D): the first dimension corresponds to SD comprising $P_{CSIRS}$ CSI-RS antenna ports (in total across all of $N_{RRH}$ RRHs/TRPs), the second dimension corresponds to FD comprising $N_3$ FD units (e.g., SB), and the third dimension corresponds to DD comprising $N_4$ DD units (e.g., ST). The 3D channel measurements can be compressed using basis vectors (or matrices) similar to the Rel. 16 enhanced Type II codebook. Let $W_1$, $W_f$, and $W_d$ respectively denote basis matrices whose columns comprise basis vectors for SD, FD, and DD.

In one embodiment, the DD compression (or DD component or $W_d$ basis) can be turned OFF/ON from the codebook. When turned OFF, $W_d$ can be fixed (hence not reported), e.g., $W_d=1$ (scalar 1) or $W_d=[1, \dots, 1]$ (all-one vector) or $W_d=[1, \dots, 1]$ (all-one vector), where n is a scaling factor (e.g., $n=N_4$) or $W_d=h_{d*}=[\phi_0^{(d*)} \ \phi_0^{(d*)} \ \dots \ \phi_{N_4-1}^{(d*)}]$, where d* is an index of a fixed DD basis vector ha. In one example, d*=0. In one example, when the DD basis vectors comprise an orthogonal DFT basis set, had is a DD basis vector which corresponds to the DC component. When turned ON, $W_d$ (DD basis vectors) is reported.

> In one example, $W_d$ is turned OFF/ON via an explicit signaling, e.g., an explicit RRC parameter.
>
> In one example, $W_d$ is turned OFF/ON via a codebook parameter. For example, similar to M=1 in Rel. 17, when N=1 is configured, $W_d$ is turned OFF, and when a value N>1 is configured, $W_d$ is turned ON. Here, N denotes a number of DD basis vectors comprising columns of $W_d$.
>
> In one example, the UE reports whether the DD component is turned OFF (not reported) or ON (reported). This reporting can be via a dedicated parameter (e.g., new UCI/CSI parameter). Or this reporting can be via an existing parameter (e.g., PMI component). A two-part UCI (cf. Rel. 15 NR) can be reused wherein the information whether $W_d$ is turned OFF/ON is included in UCI part 1.
>
> In one example, $W_d$ is turned OFF/ON depending on the codebookType. When the codebookType is regular Type II codebook (similar to Rel 16 Type II codebook), $W_d$ is turned ON, and when the codebookType is Type II port selection codebook (similar to Rel 17 Type II codebook), $W_d$ is turned ON/OFF.

In one embodiment, a UE is configured with a first CSI reporting (e.g., via a first higher layer IE CSI-ReportConfig) based on a first codebook C1, and a second CSI reporting (e.g., via a second higher layer IE CSI-ReportConfig) based on a second codebook C2.

The first CSI reporting can be linked to a NZP CSI-RS resource (e.g., that can be within a CSI-RS resource set) or multiple CSI-RS resources (e.g., that can be within a CSI-RS resource set), where the NZP CSI-RS resource(s) can be non-beamformed (or non-precoded), or, beam-formed (pre-coded).

The second CSI reporting can be linked to a NZP CSI-RS resource (e.g., that can be within a CSI-RS resource set) or multiple CSI-RS resources (e.g., that can be within a CSI-RS resource set), where the NZP CSI-RS resource(s) can be beam-formed (pre-coded) using SD and/or FD basis vectors, which for example, can be based on the first CSI reporting (using the first codebook C1) or based on SRS measurements.

In one example, the UE can receive triggering messages/indications for the first and the second CSI reports separately via two separate CSI trigger states, where the two CSI trigger states can be triggered via a single DCI or two separate DCIs. Two separate slot offsets can also be configured for the two CSI reports.

In one example, the UE can receive triggering messages/indications for the first and the second CSI reports jointly via a joint CSI trigger state which triggers the two CSI reports. Two separate slot offsets can also be configured for the two CSI reports. Or a slot offset for the first CSI report is configured, and a slot offset for the second CSI report can be obtained based on the configured slot offset for the first CSI report, e.g., O2=O1+x, where O1 is the configured slot offset for the first CSI report, and x is a fixed value.

In one example, there is no relation/inter-dependence between the two CSI reports from the CSI calculation and/or reporting perspective, i.e., the first CSI report is not dependent on the second CSI report, or vice versa.

In one example, there is a relation/inter-dependence between the two CSI reports. For instance, the second CSI report can depend on the first CSI report. In one example, W1 and/or $W_f$ from the first CSI report can be used to determine/report the second CSI report (and/or to beam-form CSI-RS resource(s) for the second CSI report). In one example, the rank ($v_2$) value for the second CSI report can be according to at least one of the following examples.

> In one example, $v_2=v_1$ where $v_1$ is the rank value reported in the first CSI report.
>
> In one example, $v_2 \leq v_1$.
>
> In one example, the rank ($v_2$) value for the second CSI report is fixed, and hence not reported. The fixed value can be determined based on $v_1$. In one example, the rank ($v_2$) value for the second CSI report is configured (e.g., via RRC), and hence not reported. The configured $v_2$ may or may not depend on $v_1$. In one example, the rank ($v_2$) value for the second CSI report is reported from a set of candidate values. The set of candidate values may or may not depend on $v_1$.

In one example, the relation/inter-dependence can be up to NW implementation. For instance, the second CSI report can be (or is expected to be) triggered after the first CSI report is triggered/reported by the UE and/or received at the NW/gNB.

In one example, the first codebook C1 is one of Rel. 16 enhanced Type II codebook (cf. 5.2.2.2.5, TS 38-214) or Rel. 16 enhanced port selection Type II codebook (cf. 5.2.2.2.6, TS 38-214) or Rel. 17 further enhanced port selection Type II codebook (cf. 5.2.2.2.7, TS 38-214). The first codebook C1 provides/indicates the following components:

> W1 comprising L spatial domain (SD) basis vectors, and
>
> $W_f$ comprising M or $M_v$ frequency domain (FD) basis vectors.

The first codebook C1 can also provide W2 components, which can comprise the following.

The strongest coefficient indicators (SCI),

The bitmap indicating the indices of the non-zero (NZ) coefficients,

The reference amplitude coefficient (e.g., for 1 of the 2 groups of coefficients having the same antenna polarization), The amplitude coefficients for $K^{NZ}-v$ NZ coefficients, and The phase coefficients for $K^{NZ}-v$ NZ coefficients.

When v>1, the W2 components can be reported for each layer separately. Here, $K^{NZ}$ is the total number of NZ coefficients.

In one example, the second codebook C2 is a new codebook, which provides $W_t$ comprising N or $N_v$ TD/DD basis vectors. The second codebook C2 can also provide W2 components, as explained above.

> In one example, the second codebook C2 can also include
>
> W1 comprising L' SD basis vectors, and/or
>
> $W_f$ comprising M' or M, FD basis vectors.
>
> Here, $L' \leq L$ and $M' \leq M$ or $M_v' \leq M_v$, which implies that W1 and/or $W_f$ reporting payload (in terms of number of bits) can be smaller than that for the first CSI report.
>
> In one example, similar to Rel. 17 further enhanced port selection Type II codebook, M' or $M_v'$ can take small values, e.g., from [1,2]. Likewise, L' can take small values, e.g., from {2,3}.

In one example, the W1 reporting can be turned ON/OFF, e.g., based on higher layer signaling. For example, when $$L' = \frac{P_2}{2}$$

is configured, W1 reporting is turned OFF (not reported), where $P_2$ is the number of CSI-RS ports configured for the second CSI reporting.

In one example, the Wf reporting can be turned ON/OFF, e.g., based on higher layer signaling. For example, when $M'=1$ or $M_v'=1$ is configured, Wf reporting is turned OFF (not reported).

In one example, a set of candidate FD basis vectors (e.g., within a window of consecutive basis vectors, which can start from the FD basis vector with index 0) can be configured, e.g., via higher layer. Let Z number of basis vectors in the configured set. When $Z=M$ is configured, then Wf is configured, hence doesn't require any reporting. When $Z>M$ is configured, then Wf is reported from the configured set.

In one example, the first codebook C1 can either be regular or port selection Type II codebook, and the second codebook C2 is expected to be a port selection Type II codebook.

In one example, the components of the first and second codebooks can be reported via a PMI, where the PMI can include multiple indicators, each indicating different codebook components. When a codebook component (e.g., bitmap, SCI, amplitude or phase coefficients) is reported independently for each layer, the corresponding indicator can be a vector comprising one (sub-)indicator for each layer.

In one embodiment, a UE is configured with a CSI reporting (e.g., via a higher layer IE CSI-ReportConfig) based on a codebook C3, where the codebook provides/indicates the following components W1 comprising L spatial domain (SD) basis vectors, Wf comprising M or $M_v$ frequency domain (FD) basis vectors, and W2 comprising D tuples $\{(u_1, v_i, d_i)\}$, where $i=1, \ldots, D$, $u_i$ is a vector, $v_i$ is a vector, and $d_i$ is non-negative number.

In one example, $\overline{W}_2=[W_{2,1} \ldots W_{2,B}]$ is a concatenated matrix obtained by concatenating the coefficient matrices $W_{2,1} \ldots W_{2,B}$ corresponding to $B>1$ CSI-RS measurement (time) instances. Then, $\overline{W}_2$ can be expressed as follows:

$\overline{W}_2=\Sigma_{i=1}^D d_i u_i v_i^*$. In one example, matrices $W_{2,1} \ldots W_{2,B}$ can be obtained based on (or using) the same W1 and $W_f$ basis vectors.

In one example, D is fixed (E.g., 1 or 2), or configured (e.g., via higher layer), or reported by the UE (e.g., via a UCI parameter in UCI part 1 of a two-part UCI).

In one example, $(u_1, v_i, d_i)$ corresponds to or represents a left singular vector, a right singular vector and a singular value of $\overline{W}_2$.

For rank>1 $(v>1)$, $\overline{W}_2$ is reported for each layer separately, i.e., $\overline{W}_2$ for layer 1 can be written as $\overline{W}_{2,l}=[W_{2,1,l} \ldots W_{2,B,l}]$ with matrices $W_{2,1,l} \ldots W_{2,B,l}$ for layer 1. Here, $l \in \{1, \ldots, v\}$.

In one example, W1 and Wf can be reported common for all layers, and $W_{2,1,l} \ldots W_{2,B,l}$ for all $l=1, \ldots, v$ can be obtained based on (or using) the same common W1 and Wf basis vectors.

In one example, W1 and Wf can be reported independently/separately for each layer, and $W_{2,1,l} \ldots W_{2,B,l}$ for a layer 1 can be obtained based on (or using) the W1 and Wf basis vectors for the corresponding layer 1.

In one example, W1 can be reported common for all layers and Wf can be reported independently/separately for each layer, then $W_{2,1,l} \ldots W_{2,B,l}$ for a layer 1 can be obtained based on (or using) the common W1 and $W_f$ basis vectors for the corresponding layer 1.

In one example, Wf can be reported common for all layers and W1 can be reported independently/separately for each layer, then $W_{2,1,l} \ldots W_{2,B,l}$ for a layer 1 can be obtained based on (or using) the common Wf and W1 basis vectors for the corresponding layer 1.

In one example, $W_{2,1}$ or $W_{2,1,l}$ is a matrix of size $2L \times M$ or $2L \times M_v$ or $M \times 2L$ or $M_v \times 2L$.

In one example, $W_{2,1}$ or $W_{2,1,l}$ is a vector of size $2LM \times 1$ or $2LM_v \times 1$.

In one example, $W_{2,1}$ or $W_{2,1,l}$ is a vector of size $K_l^{NZ} \times 1$ where $K_l^{NZ}$ is the number of non-zero coefficients for layer 1. In this example, $K_l^{NZ}$ value is assumed to be the same for all B time instances. The locations of the NZ coefficients (e.g., a bitmap) are reported for each layer, and the locations remain the same for all B time instances.

Each element $u_{i,k}$ of a vector $u_i$ can be represented/quantized as $u_{i,k}=a_{i,k} \times b_{i,k}$ where $a_{i,k}$ and $b_{i,k}$ are amplitude and phase of element $u_{i,k}$. In one example, $a_{i,k}$ and $b_{i,k}$ for each element $u_{i,k}$ can be reported using A and B bit amplitude and phase codebooks. In one example, $A=3$ or 4. In one example, $B=3$ or 4.

Each element $v_{i,m}$ of a vector $v_i$ can be represented/quantized as $u_{i,m}=c_{i,m} \times g_{i,m}$ where $c_{i,m}$ and $g_{i,m}$ are amplitude and phase of element $v_{i,m}$. In one example, $c_{i,m}$ and $g_{i,m}$ for each element $v_{i,m}$ can be reported using C and G bit amplitude and phase codebooks. In one example, $C=3$ or 4. In one example, $G=3$ or 4.

Each $d_i$ can be represented/quantized using a H bit amplitude codebook. In one example, $H=3$ or 4.

In one example, when A, C, or $H=3$, the amplitude codebook is Table 3.

TABLE 3

| Index | Amplitude value |
|---|---|
| 0 | $\frac{1}{8\sqrt{2}}$ |
| 1 | $\frac{1}{8}$ |
| 2 | $\frac{1}{4\sqrt{2}}$ |
| 3 | $\frac{1}{4}$ |
| 4 | $\frac{1}{2\sqrt{2}}$ |
| 5 | $\frac{1}{2}$ |
| 6 | $\frac{1}{\sqrt{2}}$ |
| 7 | 1 |

In one example, when A, C, or $H=4$, the amplitude codebook is Table 4.

TABLE 4

| Index | Amplitude value |
|---|---|
| 0 | Reserved |
| 1 | $\frac{1}{\sqrt{128}}$ |

TABLE 4-continued

| Index | Amplitude value |
|---|---|
| 2 | $\left(\frac{1}{8192}\right)^{1/4}$ |
| 3 | $\frac{1}{8}$ |
| 4 | $\left(\frac{1}{2048}\right)^{1/4}$ |
| 5 | $\frac{1}{2\sqrt{8}}$ |
| 6 | $\left(\frac{1}{512}\right)^{1/4}$ |
| 7 | $\frac{1}{4}$ |
| 8 | $\left(\frac{1}{128}\right)^{1/4}$ |
| 9 | $\frac{1}{\sqrt{8}}$ |
| 10 | $\left(\frac{1}{32}\right)^{1/4}$ |
| 11 | $\frac{1}{2}$ |
| 12 | $\left(\frac{1}{8}\right)^{1/4}$ |
| 13 | $\frac{1}{\sqrt{2}}$ |
| 14 | $\left(\frac{1}{2}\right)^{1/4}$ |
| 15 | 1 |

In one example, when B or G=3, the phase codebook is $$\left\{\varphi_c = e^{j\frac{2\pi c}{8}}; c = 0, 1, \ldots, 7\right\}.$$

In one example, when B or G=4, the phase codebook is $$\left\{\varphi_c = e^{j\frac{2\pi c}{16}}; c = 0, 1, \ldots, 15\right\}.$$

In one embodiment, a UE is configured with a CSI reporting (e.g., via a higher layer IE CSI-ReportConfig) based on a codebook C3, where the codebook provides/indicates the following components W1 comprising L spatial domain (SD) basis vectors, Wf comprising M or $M_v$ frequency domain (FD) basis vectors, Wd comprising N or $N_v$ TD/DD basis vectors and W2 comprising D tuples $\{(u_i, v_i, d_i)\}$, where $i=1, \ldots, D$, $u_i$ is a vector, $v_i$ is a vector, and $d_i$ is non-negative number.

In one example, $\overline{W}_2=[W_{2,1} \ldots W_{2,N}]$ or $[W_{2,1} \ldots W_{2,N_v}]$ is a concatenated matrix obtained by concatenating the coefficient matrices $W_{2,1} \ldots W_{2,N}$ or $W_{2,1} \ldots W_{2,N_v}$ corresponding to N or $N_v$ TD/DD basis vectors (or TD/DD units). Then, $\overline{W}_2$ can be expressed as follows: $\overline{W}_2 = \Sigma_{i=1}^{D} = d_i u_i v_i$.

In one example, D is fixed (E.g., 1 or 2), or configured (e.g., via higher layer), or reported by the UE (e.g., via a UCI parameter in UCI part 1 of a two-part UCI).

In one example, matrices $W_{2,1} \ldots W_{2,N}$ or $W_{2,1} \ldots W_{2,N_v}$ can be obtained based on (or using) the same W1 and Wf basis vectors.

In one example, $(u_i, v_i, d_i)$ corresponds to or represents a left singular vector, a right singular vector and a singular value of $\overline{W}_2$.

For rank>1 (v>1), $\overline{W}_2$ is reported for each layer separately, i.e., $\overline{W}_2$ for layer 1 can be written as $\overline{W}_{2,l} = [W_{2,1,l} \ldots W_{2,N,l}]$ with matrices $W_{2,1,l} \ldots W_{2,N,l}$ for layer l. Here, $l \in \{1, \ldots, v\}$.

In one example, W1 and Wf can be reported common for all layers, and $W_{2,1,l} \ldots W_{2,N,l}$ for all $l=1, \ldots, v$ can be obtained based on (or using) the same common W1 and Wf basis vectors.

In one example, W1 and Wf can be reported independently/separately for each layer, and $W_{2,1,l} \ldots W_{2,N,l}$ for a layer l can be obtained based on (or using) the W1 and Wf basis vectors for the corresponding layer l.

In one example, W1 can be reported common for all layers and Wf can be reported independently/separately for each layer, then $W_{2,1,l} \ldots W_{2,N,l}$ for a layer l can be obtained based on (or using) the common W1 and Wf basis vectors for the corresponding layer l.

In one example, Wf can be reported common for all layers and W1 can be reported independently/separately for each layer, then $W_{2,1,l} \ldots W_{2,N,l}$ for a layer l can be obtained based on (or using) the common Wf and W1 basis vectors for the corresponding layer l.

In one example, $W_{2,1}$ or $W_{2,1,l}$ is a matrix of size 2L×M or 2L×$M_v$ or M×2L or $M_v$×2L.

In one example, $W_{2,1}$ or $W_{2,1,l}$ is a vector of size 2LM×1 or 2L$M_v$×1.

In one example, $W_{2,1}$ or $W_{2,1,l}$ is a vector of size $K_l^{NZ}$×1 where $K_l^{NZ}$ is the number of non-zero coefficients for layer l. In this example, $K_l^{NZ}$ value is assumed to be the same for all N or $N_v$ TD/DD basis vectors. The locations of the NZ coefficients (e.g., a bitmap) are reported for each layer, and the locations remain the same for all N or $N_v$ TD/DD basis vectors.

Each element $u_{i,k}$ of a vector $u_i$ can be represented/quantized as $u_{i,k} = a_{i,k} \times b_{i,k}$ where $a_{i,k}$ and $b_{i,k}$ are amplitude and phase of element $u_{i,k}$. In one example, $a_{i,k}$ and $b_{i,k}$ for each element $u_{i,k}$ can be reported using A and B bit amplitude and phase codebooks. In one example, A=3 or 4. In one example, B=3 or 4.

Each element $v_{i,m}$ of a vector $v_i$ can be represented/quantized as $u_{i,m} = c_{i,m} \times g_{i,m}$ where $c_{i,m}$ and $g_{i,m}$ are amplitude and phase of element $v_{i,m}$. In one example, $c_{i,m}$ and $g_{i,m}$ for each element $v_{i,m}$ can be reported using C and G bit amplitude and phase codebooks. In one example, C=3 or 4. In one example, G=3 or 4.

Each $d_i$ can be represented/quantized using a H bit amplitude codebook. In one example, H=3 or 4.

In one example, when A, C, or H=3, the amplitude codebook is Table 3.

In one example, when A, C, or H=4, the amplitude codebook is Table 4.

In one example, when B or G=3, the phase codebook is $$\left\{ \varphi_c = e^{j\frac{2\pi c}{8}} ; c = 0, 1, \dots, 7 \right\}.$$

In one example, when B or G=4, the phase codebook is $$\left\{ \varphi_c = e^{j\frac{2\pi c}{16}} ; c = 0, 1, \dots, 15 \right\}.$$

According to TS 38.331 [REF11], the periodicity (p) and offset (o) of an SP or a periodic (P) NZP CSI-RS resource can be configured via an IE CSI-ResourcePeriodicityAnd-Offset based on Table 5. The min value of p is slots4 indicating 4 (time) slots. For a high-velocity UE, a value of p lower than 4 may be needed in order to measure a CSI-RS burst with a sufficient value of B (or within a small window of time).

TABLE 5

CSI-ResourcePeriodicityAndOffset information element

```
-- ASN1START
-- TAG-CSI-RESOURCEPERIODICITYANDOFFSET-START
CSI-ResourcePeriodicityAndOffset ::=  CHOICE {
    slots4              INTEGER (0..3),
    slots5              INTEGER (0..4),
    slots8              INTEGER (0..7),
    slots10             INTEGER (0..9),
    slots16             INTEGER (0..15),
    slots20             INTEGER (0..19),
    slots32             INTEGER (0..31),
    slots40             INTEGER (0..39),
    slots64             INTEGER (0..63),
    slots80             INTEGER (0..79),
    slots160            INTEGER (0..159),
    slots320            INTEGER (0..319),
    slots640            INTEGER (0..639)
}
-- TAG-CSI-RESOURCEPERIODICITYANDOFFSET-STOP
-- ASN1STOP
```

In the present disclosure, several examples are provided to facilitate high velocity UEs to measure the CSI-RS burst(s) fast based on P or SP CSI-RS resources.

In one embodiment, a UE can be configured with a SP or P CSI-RS resource with a periodicity (p) less than 4 (slots). The SP or P CSI-RS resource can be used to provide/configure a CSI-RS burst as described in this disclosure. When p=3 slots, the offset (o) is a value from (0 . . . 0.2). When p=2 slots, the offset (o) is a value from (0 . . . 1). When p=1 slot, the offset (o) is 0, or is not provided (configured), or if provided, is ignored by the UE. The UE can be further configured with a CSI reporting (e.g., via a higher layer IE CSI-ReportConfig) based on a codebook (including DD/TD components), where the CSI reporting can be linked to the SP or P CSI-RS source with p<4 (e.g., via a higher layer IE CSI-ResourceConfig).

In one example, only one value less than 4 is supported, hence can be configured. In one example, the one value is p=3. In one example, the one value is p=2. In one example, the one value is p=1.

In one example, two values less than 4 are supported, hence one of them can be configured. In one example, the two values are p=2,3. In one example, the two values are p=1,3. In one example, the two values are p=1,2.

In one example, three values (p=1,2,3) less than 4 are supported, hence one of them can be configured.

In one example, this configuration (i.e., a SP or P CSI-RS resource with a periodicity (p) less than 4 slots) is restricted to the case when the UE is configured with a CSI reporting based on a CSI-RS burst and/or codebook that includes DD or TD components (as described in this disclosure).

In one example, this configuration (i.e., a SP or P CSI-RS resource with a periodicity (p) less than 4 slots) can be subject to UE capability, i.e., the UE can report via its UE capability reporting whether it supports such a configuration.

FIG. 19 illustrates an example of a UE configured with multiple SP CSI-RS resources within a CSI-RS resource set 1900 according to embodiments of the present disclosure. The embodiment of the example of a UE configured with multiple SP CSI-RS resources within a CSI-RS resource set 1900 illustrated in FIG. 19 is for illustration only. FIG. 19 does not limit the scope of this disclosure to any particular implementation of the example of a UE configured with multiple SP CSI-RS resources within a CSI-RS resource set.

The SP CSI-RS resource can be measured within a measurement window [k, k+$W_{meas}$−1], where the first measurement instance is in a time slot k and the last measurement instance is in a time slot k+$W_{meas}$−1. In one example, the first measurement instance are determined based on a MAC CE based activation command and the last measurement instance is in a time slot k+$W_{meas}$−1 that is determined based on a RRC parameter or a MAC CE based deactivation command or a fixed rule.

In one example, the first measurement instance are determined based on a DCI (e.g., the DCI triggering the CSI reporting based on the Doppler codebook as described in this disclosure), and the last measurement instance is in a time slot k+$W_{meas}$−1 that is determined based on a RRC parameter or a MAC CE based deactivation command or a fixed rule.

In one embodiment, a UE can be configured with multiple SP CSI-RS resources, where each SP CSI-RS resource can be used to provide/configure a CSI-RS burst (when multiple bursts are configured) as described in this disclosure, or each SP CSI-RS resource can be used to provide/configure a part of a CSI-RS burst comprising multiple parts (when a CSI-RS burst with multiple parts is configured) as described in the present disclosure.

The multiple SP CSI-RS resources can be measured within a measurement window or respective measurement windows, where the first measurement instances of the SP CSI-RS resources can be determined based on a common (or joint) MAC CE based activation command, or separate (independent) MAC CE based activation commands. Likewise, the last measurement instances of the SP CSI-RS resources can be determined based on a joint RRC parameter or separate RRC parameter, or a joint (common) MAC CE based deactivation command or separate (independent) MAC CE based deactivation commands.

In one embodiment, a UE can be configured with multiple SP CSI-RS resources within a CSI-RS resource set, where all of the CSI-RS resources within the CSI-RS resource set are configured with the same periodicity, while the slot offset are the same for different CSI-RS resources. That is, all CSI-RS resources are transmitted (measured) in the same slot. The UE can be further configured with a CSI reporting (e.g., via a higher layer IE CSI-ReportConfig) based on a codebook (including DD/TD components), where the CSI reporting can be linked to the CSI-RS resource set including the multiple SP CSI-RS resources (e.g., via a higher layer IE CSI-ResourceConfig).

The number of CSI-RS measurement instances (B) comprising the CSI-RS burst is equal to the number measurement (time/slot) instances of SL CSI-RS resources.

In one example, this configuration is limited (restricted) to the case when the number of CSI-RS ports (P) associated with each CSI-RS resource is such that $P<=x$, where x can be threshold which can be fixed, or configured, or reported by the UE (via CSI report and/or UE capability).

In one example, the CSI reporting corresponds to P CSI-RS ports, i.e., in this case, each of the P CSI-RS ports is measured Q times (via Q CSI-RS resources) within each measurement instance.

In one example, the CSI reporting corresponds to PxQ CSI-RS ports, where Q is the number of SP CSI-RS resources within the CSI-RS resource set, i.e., in this case, CSI-RS ports across Q CSI-RS resources are aggregated for the CSI reporting.

In one embodiment, a UE can be configured with multiple SP CSI-RS resources within a CSI-RS resource set, where all of the CSI-RS resources within the CSI-RS resource set are configured with the same periodicity, while the slot offset are different for different CSI-RS resources. That is, all CSI-RS resources are transmitted (measured) in different slots (due to different offsets). The UE can be further configured with a CSI reporting (e.g., via a higher layer IE CSI-ReportConfig) based on a codebook (including DD/TD components), where the CSI reporting can be linked to the CSI-RS resource set including the multiple SP CSI-RS resources (e.g., via a higher layer IE CSI-ResourceConfig). An example is illustrated in FIG. 19.

The number of CSI-RS measurement instances (B) comprising the CSI-RS burst is aggregated and is equal to the total number across all SP CSI-RS resources, e.g., B=B1+ B2, when 2 SP CSI-RS resources with B1 and B2 measurement instances.

In one example, the multiple SP CSI-RS resources can comprise (correspond to) a uniformly separated CSI-RS burst when the offset of multiple CSI-RS resources are uniformly separated. For example, for 2 CSI-RS resources each with periodicity=p, when their slot offsets (o1 and o2) are such that o1−o2=P/2, the two CSI-RS resources comprise (correspond to) a uniformly separated CSI-RS burst (with effective periodicity P/2).

In one example, the multiple SP CSI-RS resources can comprise (correspond to) a non-uniformly separated CSI-RS burst, when the offset of multiple CSI-RS resources are non-uniformly separated. For example, for 2 CSI-RS resources each with periodicity=p, when their slot offsets (o1 and o2) can be any number, the two CSI-RS resources comprise (correspond to) a non-uniformly separated CSI-RS burst.

In one embodiment, a UE can be configured with multiple SP CSI-RS resources within a CSI-RS resource set, where all of the CSI-RS resources within the CSI-RS resource set are configured with the same periodicity, while the slot offset can be the same or different for different CSI-RS resources. That is, some CSI-RS resource(s) can be transmitted (measured) in the same slots and some other CSI-RS resource(s) can be transmitted (measured) in different slots (due to different offsets). The UE can be further configured with a CSI reporting (e.g., via a higher layer IE CSI-ReportConfig) based on a codebook (including DD/TD components), where the CSI reporting can be linked to the CSI-RS resource set including the multiple SP CSI-RS resources (e.g., via a higher layer IE CSI-ResourceConfig).

In one example, multiple SP CSI-RS resources can be grouped/partitioned into two subsets/groups (S1 and S2), where S1 and S2 have different offsets o1 and o2, respectively. The subset S1 includes N1>=1 resources and the subset S2 includes N2>=1 resources.

In one example, N1>1, N2=1.
In one example, N1=1, N2>1.
In one example, N1>1, N2>1.
In one example, N1=N2.
In one example, N1 can be equal to or different from N2.

The number of CSI-RS measurement instances (B) comprising the CSI-RS burst is aggregated and is equal to the total number across all SP CSI-RS resources, e.g., B=B1+ B2, when 2 SP CSI-RS resource groups/subsets with B1 and B2 measurement instances.

In one example, the two SP CSI-RS resource groups/ subsets can comprise (correspond to) a uniformly separated CSI-RS burst when their offsets are uniformly separated. For example, for 2 CSI-RS resource subsets each with periodicity=p, when their slot offsets (o i and o2) are such that o1−o2=P/2, the two CSI-RS resource subsets comprise (correspond to) a uniformly separated CSI-RS burst (with effective periodicity P/2).

In one example, the two SP CSI-RS resource groups/ subsets can comprise (correspond to) a non-uniformly separated CSI-RS burst, when their offsets are non-uniformly separated. For example, for 2 CSI-RS resource subsets each with periodicity=p, when their slot offsets (o1 and o2) can be any number, the two CSI-RS resource subsets comprise (correspond to) a non-uniformly separated CSI-RS burst.

In one example, the CSI reporting corresponds to P CSI-RS ports, i.e., in this case, each of the P CSI-RS ports is measured Q times (via Q CSI-RS resources) within each measurement instance.

In one example, when N1=N2=Q/2, the CSI reporting corresponds to PxQ/2 CSI-RS ports, where Q is the number of SP CSI-RS resources within the CSI-RS resource set, i.e., in this case, CSI-RS ports across Q/2 CSI-RS resources within each subset are aggregated for the CSI reporting.

In one embodiment, a UE can be configured with multiple SP CSI-RS resources within a CSI-RS resource set, as described herein, where the number of SP CSI-RS resources (Q) is according to at least one of the following examples.

In one example, Q can be fixed, e.g., Q=2.
In one example, Q can depend on UE speed or Doppler components (Doppler shift or spectrum), e.g., for small/ medium speed UEs (low/medium Doppler), Q=1, and for high speed UEs (or high Doppler), Q>1.

In one example, Q may depend on the periodicity value p. For example, Q=1,2, . . . , x, where $x<=p$.

In one example, Q can be configurable, e.g., Q=1,2, or Q=1,2, . . . , x ($x<=P$). This configuration can be subject to UE capability.

In one embodiment, a UE can be configured with multiple SP CSI-RS resources within a CSI-RS resource set, as described herein, where the SP CSI-RS resources within the set are limited (or restricted) according to at least one of the following examples.

In one example, the number of CSI-RS ports (P) associated with the SP CSI-RS resources within the set are the same.

In one example, the CSI-RS density associated with the SP CSI-RS resources within the set are the same.

In one example, the frequency domain resource allocation (e.g., starting RB, number of RBs) associated with the SP CSI-RS resources within the set are the same.

In one example, the cdm-type associated with the SP CSI-RS resources within the set are the same.

In one embodiment, a UE can be configured with two CSI-RS resource sets, each with 1 SP CSI-RS resource. The UE can be further configured with a CSI reporting (e.g., via a higher layer IE CSI-ReportConfig) based on a codebook (including DD/TD components), where the CSI reporting can be linked to the CSI-RS resource sets including the two SP CSI-RS resources (e.g., via a higher layer IE CSI-ResourceConfig).

In one example, the two CSI-RS resources within the two CSI-RS resource sets are configured with the same periodicity, while their slot offsets are according to at least one of the following examples.

In one example, the slot offset are the same for the two CSI-RS resources. The rest of the details can be the same as described herein except that the two SP CSI-RS resources are within two CSI-RS resource sets.

In one example, the slot offset are different for the two CSI-RS resources. The rest of the details can be the same as described herein except that the two SP CSI-RS resources are within two CSI-RS resource sets.

In one example, the slot offset are the same or different for the two CSI-RS resources. The rest of the details can be the same as described herein except that the two SP CSI-RS resources are within two CSI-RS resource sets.

In one example, the two CSI-RS resources within the two CSI-RS resource sets are configured with the same or different periodicity, while their slot offsets are according to at least one of the following examples.

In one example, the slot offset are the same for the two CSI-RS resources. The rest of the details can be the same as described herein except that the two SP CSI-RS resources are within two CSI-RS resource sets.

In one example, the slot offset are different for the two CSI-RS resources. The rest of the details can be the same as described herein except that the two SP CSI-RS resources are within two CSI-RS resource sets.

In one example, the slot offset are the same or different for the two CSI-RS resources. The rest of the details can be the same as described herein except that the two SP CSI-RS resources are within two CSI-RS resource sets.

The two SP CSI-RS resources within the two sets are limited (or restricted) according to at least one of the following examples.

In one example, the number of CSI-RS ports (P) associated with the SP CSI-RS resources within the two sets are the same.

In one example, the CSI-RS density associated with the SP CSI-RS resources within the two sets are the same.

In one example, the frequency domain resource allocation (e.g., starting RB, number of RBs) associated with the SP CSI-RS resources within the two sets are the same.

In one example, the cdm-type associated with the SP CSI-RS resources within the two sets are the same.

In one embodiment, a UE can be configured with two CSI-RS resource groups within a CSI-RS resource set, each group comprises 1 SP CSI-RS resource. The UE can be further configured with a CSI reporting (e.g., via a higher layer IE CSI-ReportConfig) based on a codebook (including DD/TD components), where the CSI reporting can be linked to the CSI-RS resource set (and/or two groups) including the two SP CSI-RS resources (e.g., via a higher layer IE CSI-ResourceConfig).

In one example, the two CSI-RS resources within the two CSI-RS resource groups are configured with the same periodicity, while their slot offsets are according to at least one of the following examples.

In one example, the slot offset are the same for the two CSI-RS resources. The rest of the details can be the same as described herein except that the two SP CSI-RS resources are within two CSI-RS resource groups.

In one example, the slot offset are different for the two CSI-RS resources. The rest of the details can be the same as described herein except that the two SP CSI-RS resources are within two CSI-RS resource groups.

In one example, the slot offset are the same or different for the two CSI-RS resources. The rest of the details can be the same as described herein except that the two SP CSI-RS resources are within two CSI-RS resource groups.

In one example, the two CSI-RS resources within the two CSI-RS resource groups are configured with the same or different periodicity, while their slot offsets are according to at least one of the following examples.

In one example, the slot offset are the same for the two CSI-RS resources. The rest of the details can be the same as described herein except that the two SP CSI-RS resources are within two CSI-RS resource groups.

In one example, the slot offset are different for the two CSI-RS resources. The rest of the details can be the same as described herein except that the two SP CSI-RS resources are within two CSI-RS resource groups.

In one example, the slot offset are the same or different for the two CSI-RS resources. The rest of the details can be the same as described herein except that the two SP CSI-RS resources are within two CSI-RS resource groups.

The two SP CSI-RS resources within the two groups are limited (or restricted) according to at least one of the following examples.

In one example, the number of CSI-RS ports (P) associated with the SP CSI-RS resources within the two groups are the same.

In one example, the CSI-RS density associated with the SP CSI-RS resources within the two groups are the same.

In one example, the frequency domain resource allocation (e.g., starting RB, number of RBs) associated with the SP CSI-RS resources within the two groups are the same.

In one example, the cdm-type associated with the SP CSI-RS resources within the two groups are the same.

In one embodiment, a UE can be configured with K>1 CSI-RS resource groups within a CSI-RS resource set or K>1 CSI-RS resource sets, each set/group comprises 1 SP CSI-RS resource. The UE can be further configured with a CSI reporting (e.g., via a higher layer IE CSI-ReportConfig) based on a codebook (including DD/TD components), where the CSI reporting can be linked to the K CSI-RS resource sets (or K groups within one set) including the K SP CSI-RS resources (e.g., via a higher layer IE CSI-ResourceConfig). The rest of the details can the same as other embodiments described herein except that the two SP CSI-RS resource sets or groups are replaced with (or extended to) more than one, i.e., 2 or more.

In one embodiment, a UE can be configured with one CSI-RS resource set that is linked to a CSI reporting (e.g., via a higher layer IE CSI-ReportConfig) based on a codebook (including DD/TD components). The CSI-RS resource set includes SP CSI-RS resources for channel measurement (CMR) from multiple TRPs. In one example, when the number of TRPs is 2, this configuration can be via a parameter cmrGroupingAndPairing-r18 in NZP-CSI-RS-ResourceSet whose ID can be included in the CSI-ResourceConfig. The parameter cmrGroupingAndPairing-r18 configures CMR groups (for sTRP hypotheses) and pairs (mTRP hypotheses), i.e., the first nrofResourcesGroup1 SP CSI-RS resources in the NZP-CSI-RS resource set belong to Group 1 and the following nrofResourcesGroup2 SP CSI-RS resources in the NZP-CSI-RS resource set belong to Group 2, and at least one pair of SP CSI-RS resources (one for each TRP).

$N_{ST}$ contiguous time instances/slots. In this example, a component for the DD compression corresponds to a ST/DD unit. Three examples of the ST/DD units are shown in FIG. 20 when X is as defined above. In the first example, each ST/DD unit comprises $N_{ST}=d=1$ time instances. In the second example, each ST/DD unit comprises $N_{ST}=d=2$ contiguous time instances. In the third example, each ST/DD unit comprises $N_{ST}=d=4$ contiguous time instances.

The value of $N_{ST}$ or d can be fixed (e.g., $N_{ST}$ or d=1 or 2 or 4) or indicated to the UE (e.g., via higher layer RRC or

---

| NZP-CSI-RS-ResourceSet information element |
|---|

```
-- ASN1START
-- TAG-NZP-CSI-RS-RESOURCESET-START
NZP-CSI-RS-ResourceSet ::=          SEQUENCE {
    nzp-CSI-ResourceSetId           NZP-CSI-RS-ResourceSetId,
    nzp-CSI-RS-Resources               SEQUENCE (SIZE (1..maxNrofNZP-CSI-RS-
ResourcesPerSet)) OF NZP-CSI-RS-ResourceId,
    repetition                      ENUMERATED { on, off }       OPTIONAL,
-- Need S
    aperiodic TriggeringOffset      INTEGER(0..6)                OPTIONAL,
-- Need S
    trs-Info                        ENUMERATED {true}            OPTIONAL,
-- Need R
    ...,
    cmrGroupingAndPairing-r18             CMRGroupingAndPairing-r18
OPTIONAL    -- Need R
}
CMRGroupingAndPairing-r18 ::=       SEQUENCE {
    nrofResourcesGroup1-r18         INTEGER {1..7},
    nrofResourcesGroup2-r18         INTEGER {1..7},
    pair1OfNZP-CSI-RS-r18                  NZP-CSI-RS-Pair-r18
OPTIONAL,    -- Need R
    pair2OfNZP-CSI-RS-r18                  NZP-CSI-RS-Pair-r18
OPTIONAL    -- Need R
}
```

---

FIG. 20 illustrates an example of a UE configured to determine a value of $N_4$ based on the value B and/or C in a CSI-RS burst 2000 according to embodiments of the present disclosure. The embodiment of the example of a UE configured to determine a value of $N_4$ based on the value B and/or C in a CSI-RS burst 2000 illustrated in FIG. 20 is for illustration only. FIG. 20 does not limit the scope of this disclosure to any particular implementation of the example of a UE configured to determine a value of $N_4$ based on the value B and/or C in a CSI-RS burst.

In one embodiment, a UE is configured to determine a value of $N_4$ based on the value B and/or C, where B is the number of CSI-RS instances in a CSI-RS burst, and C is the number of time instances (without any CSI-RS resource for measurement or time instances comprising a CSI reporting window of $W_{CSI}$ slots). In one example, the B time instances correspond to a measurement window [k, $k+W_{meas}-1$] which is no later than $n_{ref}$, i.e., $k+W_{meas}-1 \leq n_{ref}$, where $n_{ref}$ is the time slot of a CSI reference resource (5.2.2.5, TS 38.214). In one example, the C time instances corresponds to a CSI reporting/validity window [1,$1+W_{CSI}-1$] which is no earlier than $n_{ref} \leq 1$. In one example, a unit of the time instance is a slot.

Here, $N_4$ is the number components across which the DD compression is performed, where each component corresponds to one or multiple time instances. In one example, $N_4$ is fixed (e.g., $N_4=B$ or C or B+C) or configured (e.g., via RRC or MAC CE or DCI) or reported by the UE (as part of the CSI report). In one example, $N_{ST}=d$ and $W_{CSI}=N_4d$. In one example, the X (where X=B or C or B+C) time instances can be partitioned into sub-time (ST) units (instances) or DD/TD units, where each ST or DD unit is defined as (up to)

MAC CE or DCI based signaling) or reported by the UE (e.g., as part of the CSI report). The value of $N_{ST}$ (fixed or indicated or reported) can be subject to a UE capability reporting. The value of $N_{ST}$ can also be dependent on the value of X Or on the type of CMRs (or NZP CSI-RS resources). In one example, when CMRs correspond to K>1 (e.g., 4 or 8) aperiodic (AP) NZP CSI-RS resources with an offset m between two consecutive of the K AP CSI-RS resources, d can be d=m, or d≤m or d=tm where t≥1 is an integer, e.g., t belongs to {1,2,4}. In one example, when CMRs correspond to a P/SP NZP CSI-RS resource, d can be according to at least one of the following examples.

In one example, d=p, where p=periodicity of the P/SP NZP CSI-RS resource.

In one example, d<p, e.g., p=1 or 2. In one example, there can be at least one restriction according to at least one of the following examples.

In one example, the max number of CSI-RS ports ($P_m$) associated with the P/SP NZP CSI-RS resource is restricted. For example, $P_m=x$ and x can be fixed (e.g., 8, 12, or 16) or reported by the UE via UE capability (e.g., from 4 or 8, 12, or 16).

In one example, the max number of CSI-RS ports ($P_m$) associated with the P/SP NZP CSI-RS resource is restricted. For example, $P_m$ x and x can be fixed (e.g., 8, 12, or 16) or reported by the UE via UE capability (e.g., from 4 or 8, 12, or 16).

In one example, the max number of CSI-RS ports ($P_m$) associated with the P/SP NZP CSI-RS resource is restricted and this restriction is dependent on the max number of CSI-RS ports ($P_{d=p}$) associated with the P/SP NZP CSI-RS resource when d=p. For example, $P_m=x<y$ and x can be fixed (e.g., 8, 12, or 16) or reported by the UE via UE capability (e.g., from 4 or 8, 12, or 16), and $y=P_{d=p}$.

In one example, the max number of CSI-RS ports ($P_m$) associated with the P/SP NZP CSI-RS resource is restricted and this restriction is dependent on the max number of CSI-RS ports ($P_{d=p}$) associated with the P/SP NZP CSI-RS resource when d=p. For example, $P_m=x=ty$ and x can be fixed (e.g., 8, 12, or 16) or reported by the UE via UE capability (e.g., from 4 or 8, 12, or 16), and $y=P_{d=p}$ and t is a fraction (e.g., t=½).

In one example, the max number of CSI-RS ports ($P_m$) associated with the P/SP NZP CSI-RS resource is restricted and this restriction is dependent on the max number of CSI-RS ports ($P_{d=p}$) associated with the P/SP NZP CSI-RS resource when d=p. For example, $P_m\le x<y$ and x can be fixed (e.g., 8, 12, or 16) or reported by the UE via UE capability (e.g., from 4 or 8, 12, or 16), and $y=P_{d=p}$.

In one example, the max number of CSI-RS ports ($P_m$) associated with the P/SP NZP CSI-RS resource is restricted and this restriction is dependent on the max number of CSI-RS ports ($P_{d=p}$) associated with the P/SP NZP CSI-RS resource when d=p. For example, $P_m\le x=ty$ and x can be fixed (e.g., 8, 12, or 16) or reported by the UE via UE capability (e.g., from 4 or 8, 12, or 16), and $y=P_d=p$ and t is a fraction (e.g., t=½).

In one example, d=p is a basis feature (i.e., any UE supporting CSI reporting based on Type II Doppler codebook as described in this disclosure and P/SP NZP CSI-RS resource must support d=p), and d<p, e.g., p=1 or 2 is an optional feature (i.e., requires a separate UE capability reporting from the UE indicating that the UE can support d<p, in addition to the basis feature d=p). In one example, there can be at least one restriction according to at least one of the following examples.

In one example, when d<p, the max number of CSI-RS ports ($P_m$) associated with the P/SP NZP CSI-RS resource is restricted. For example, $P_m=x$ and x can be fixed (e.g., 8, 12, or 16) or reported by the UE via UE capability (e.g., from 4 or 8, 12, or 16).

In one example, when d<p, the max number of CSI-RS ports ($P_m$) associated with the P/SP NZP CSI-RS resource is restricted. For example, $P_m\le x$ and x can be fixed (e.g., 8, 12, or 16) or reported by the UE via UE capability (e.g., from 4 or 8, 12, or 16).

In one example, when d<p, the max number of CSI-RS ports ($P_m$) associated with the P/SP NZP CSI-RS resource is restricted and this restriction is dependent on the max number of CSI-RS ports ($P_{d=p}$) associated with the P/SP NZP CSI-RS resource when d=p. For example, $P_m=x<y$ and x can be fixed (e.g., 8, 12, or 16) or reported by the UE via UE capability (e.g., from 4 or 8, 12, or 16), and $y=P_{d=p}$.

In one example, when d<p, the max number of CSI-RS ports ($P_m$) associated with the P/SP NZP CSI-RS resource is restricted and this restriction is dependent on the max number of CSI-RS ports ($P_{d=p}$) associated with the P/SP NZP CSI-RS resource when d=p. For example, $P_m=x=ty$ and x can be fixed (e.g., 8, 12, or 16) or reported by the UE via UE capability (e.g., from 4 or 8, 12, or 16), and $y=P_{d=p}$ and t is a fraction (e.g., t=½).

In one example, when d<p, the max number of CSI-RS ports ($P_m$) associated with the P/SP NZP CSI-RS resource is restricted and this restriction is dependent on the max number of CSI-RS ports ($P_{d=p}$) associated with the P/SP NZP CSI-RS resource when d=p. For example, $P_m\le x<y$ and x can be fixed (e.g., 8, 12, or 16) or reported by the UE via UE capability (e.g., from 4 or 8, 12, or 16), and $y=P_{d=p}$.

In one example, when d<p, the max number of CSI-RS ports ($P_m$) associated with the P/SP NZP CSI-RS resource is restricted and this restriction is dependent on the max number of CSI-RS ports ($P_{d=p}$) associated with the P/SP NZP CSI-RS resource when d=p. For example, $P_m\le x=ty$ and x can be fixed (e.g., 8, 12, or 16) or reported by the UE via UE capability (e.g., from 4 or 8, 12, or 16), and $y=P_{d=p}$ and t is a fraction (e.g., t=½).

In one example, the value of one of or both of $P_m$ and $P_{d=p}$ is reported by the UE via UE capability reporting, e.g., via the separate U capability indicating that the UE can support d<p, in addition to the basis feature d=p.

FIG. 21 illustrates an example of a UE configured based on the TD/DD unit size $N_{ST}$ 2100 according to embodiments of the present disclosure. The embodiment of the example of a UE configured based on the TD/DD unit size $N_{ST}$ 2100 illustrated in FIG. 21 is for illustration only. FIG. 21 does not limit the scope of this disclosure to any particular implementation of the example of a UE configured based on the TD/DD unit size $N_{ST}$.

At least one of the following examples can be used/configured regarding the TD/DD unit size $N_{ST}$.

In one example, the TD/DD unit size $N_{ST}$ is based on the periodicity (p) of SP CSI-RS resource(s).

In one example, as shown in example 1 of FIG. 21, the TD/DD unit size $N_{ST}=p$, when the UE is configured with a (single) SP CSI-RS resource that is linked to (or associated with) a CSI reporting based on a codebook (including DD/TD components), as explained herein.

In one example, as shown in example 2 of FIG. 21, the TD/DD unit size $$N_{ST} = \frac{p}{n},$$

when the UE is configured with multiple SP CSI-RS resources that are linked to (or associated with) a CSI reporting based on a codebook (including DD/TD components), as explained herein. Here, n is the number of SP CSI-RS resources linked to (or associated with) the CSI reporting.

In one example, the TD/DD unit size $$N_{ST} = d = \frac{p}{m},$$

when the UE is configured with one SP CSI-RS resource that are linked to (or associated with) a CSI reporting based on a codebook (including DD/TD components), as explained herein. Here, m $$m = \frac{P}{b} \text{ or } m = \left\lceil \frac{P}{b} \right\rceil \text{ or } m = \left\lfloor \frac{P}{b} \right\rfloor,$$

and b is fixed (e.g., 2).

In one example, the TD/DD unit size $$N_{ST} = d = \frac{p}{m} \text{ or } \left\lceil \frac{p}{m} \right\rceil \text{ or } \left\lfloor \frac{p}{m} \right\rfloor,$$

when the UE is configured with one SP CSI-RS resource that are linked to (or associated with) a CSI reporting based on a codebook (including DD/TD components), as explained herein. Here, m=c and c is fixed (e.g., 2).

In one example, the TD/DD unit size $N_{ST}$ is based on the periodicity (p) of periodic (P) CSI-RS resource(s).

In one example, the TD/DD unit size $N_{ST}$=p, when the UE is configured with a (single) P CSI-RS resource that is linked to (or associated with) a CSI reporting based on a codebook (including DD/TD components).

In one example, the TD/DD unit size $$N_{ST} = \frac{p}{n},$$

when the UE is configured with multiple P CSI-RS resources that are linked to (or associated with) a CSI reporting based on a codebook (including DD/TD components). Here, n is the number of P CSI-RS resources linked to (or associated with) the CSI reporting.

In one example, the TD/DD unit size $$N_{ST} = d = \frac{p}{m},$$

when the UE is configured with one P CSI-RS resource that are linked to (or associated with) a CSI reporting based on a codebook (including DD/TD components), as explained herein. Here, $$m = \frac{P}{b} \text{ or } m = \left\lceil \frac{P}{b} \right\rceil \text{ or } m = \left\lfloor \frac{P}{b} \right\rfloor,$$

and b is fixed (e.g., 2).

In one example, the TD/DD unit size $$N_{ST} = d = \frac{p}{m} \text{ or } \left\lceil \frac{p}{m} \right\rceil \text{ or } \left\lfloor \frac{p}{m} \right\rfloor,$$

when the UE is configured with one P CSI-RS resource that are linked to (or associated with) a CSI reporting based on a codebook (including DD/TD components), as explained herein. Here, m=c and c is fixed (e.g., 2).

In one example, the TD/DD unit size $N_{ST}$ is based on the periodicity (p) of periodic (P) tracking RS(s) (TRSs), i.e., the CSI-RS resource(s) configured for tracking (TS 38.214).

In one example, the TD/DD unit size $N_{ST}$=p, when the UE is configured with a (single) TRS resource that is linked to (or associated with) a CSI reporting based on a codebook (including DD/TD components).

In one example, the TD/DD unit size $$N_{ST} = \frac{p}{n},$$

when the UE is configured with multiple TRS resources that are linked to (or associated with) a CSI reporting based on a codebook (including DD/TD components). Here, n is the number of TRS resources linked to (or associated with) the CSI reporting.

In one example, the TD/DD unit size $$N_{ST} = d = \frac{p}{m},$$

when the UE is configured with one TRP resource that are linked to (or associated with) a CSI reporting based on a codebook (including DD/TD components), as explained herein. Here, $$m = \frac{P}{b} \text{ or } m = \left\lceil \frac{P}{b} \right\rceil \text{ or } m = \left\lfloor \frac{P}{b} \right\rfloor,$$

and b is fixed (e.g., 2).

In one example, the TD/DD unit size $$N_{ST} = d = \frac{p}{m} \text{ or } \left\lceil \frac{p}{m} \right\rceil \text{ or } \left\lfloor \frac{p}{m} \right\rfloor,$$

when the UE is configured with TRS resource that are linked to (or associated with) a CSI reporting based on a codebook (including DD/TD components), as explained herein. Here, m=c and c is fixed (e.g., 2).

In one example, the TD/DD unit size $N_{ST}$ is based on the separation or offset (o) between aperiodic (AP) CSI-RS resources forming a group of AP CSI-RS resources. The group of AP CSI-RS resources can be configured via RRC, or activated via MAC CE based activation command. The offset or separation between AP CSI-RS resources can be configured via RRC or indicated via MAC CE, or DCI. In one example, o=m.

In one example, the TD/DD unit size $N_{ST}$=o, when the UE is configured with multiple AP CSI-RS resources that are linked to (or associated with) a CSI reporting based on a codebook (including DD/TD components).

In one example, the TD/DD unit size $$N_{ST} = \frac{o}{n},$$

when the UE is configured with multiple AP CSI-RS resources that are linked to (or associated with) a CSI reporting based on a codebook (including DD/TD components). Here, n is the number of AP CSI-RS resources linked to (or associated with) the CSI reporting.

In one example, the TD/DD unit size $N_{ST}$ is based on the separation or offset (o) between two (time or repetition) instances of an aperiodic (AP) CSI-RS resource that is configured with repetition ON. The repetition ON can be configured via RRC or MAC CE or DCI.

In one example, the TD/DD unit size $N_{ST}$=o, when the UE is configured with the AP CSI-RS resource with repetition ON that is linked to (or associated with) a CSI reporting based on a codebook (including DD/TD components).

In one example, the TD/DD unit size $$N_{ST} = \frac{o}{n},$$

$N_{ST}$=, when the UE is configured with AP CSI-RS resource that is linked to (or associated with) a CSI reporting based on a codebook (including DD/TD components). Here, n is the number of repetition instances within one DD/TD unit.

FIG. 22 illustrates an example of a method 2200 of operating a UE according to various embodiments of the present disclosure. For example, the method 2200 may be performed by a UE such as any of UEs 111-116 and a corresponding method may be performed by a BS such as BSs 101-103. The method 2200 shown in FIG. 22 is for illustration only. Other embodiments of the method 2200 could be used without departing from the scope of the present disclosure.

The method begins with the UE receiving a configuration about a CSI report (2202). For example, in 2202, he configuration includes information about a CSI-RS burst comprising B>1 time instances of a CSI-RS transmission. The CSI-RS burst is based on K≥1 CSI-RS resources. In various embodiments, the K≥1 CSI-RS resources correspond to P or SP CSI-RS resources.

The UE then measures the CSI-RS burst (2204) and identifies a value d (2206). For example, in 2206, d is a number of consecutive time instances that are included in a DD unit of DD units and the value of d is based on a p of the P or SP CSI-RS resources. In various embodiments, when K=1, d<p. In various embodiments, when K=1, d=p. In various embodiments, when $$K > 1, \; d = \frac{p}{K} \text{ or } \left\lceil \frac{p}{K} \right\rceil \text{ or } \left\lfloor \frac{p}{K} \right\rfloor.$$

In various embodiments, $$d = \frac{p}{m} \text{ or } \left\lceil \frac{p}{m} \right\rceil \text{ or } \left\lfloor \frac{p}{m} \right\rfloor,$$

where m∈{1, 2, . . . , p}. In various embodiments, the configuration includes information about the value of d. In various embodiments, K>1, the K≥1 CSI-RS resources correspond to AP CSI-RS resources with a separate m between two consecutive AP CSI-RS resources, and d=m.

The UE then determines multiple DD basis vectors (2208). For example, in 2208, each of the multiple DD basis vectors is associated with $N_4$>1 of the DD units and where $N_4$ is a length of each of the multiple DD basis vectors. The UE then transmits the CSI report including an indication about the multiple DD basis vectors.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive, from a base station (BS), information configuring a channel state information (CSI) report, wherein the information includes codebook configuration information on a codebook of type II Doppler; and
a processor operably coupled to the transceiver, the processor configured to identify at least one of a Doppler domain (DD) unit duration or a DD basis vector length based on DD configuration information included in the codebook configuration information,
wherein the transceiver is further configured to transmit, to the BS, the CSI report based on the codebook configuration information,
wherein, when the CSI report is for an aperiodic (AP) CSI-RS including a plurality of AP CSI-RS resources, the DD unit duration is based on an offset indicated by the DD configuration information,
wherein the offset is between two AP CSI-RS resources in the plurality of AP CSI-RS resources,
wherein the DD unit duration for the AP CSI-RS is two or more,
wherein, when the CSI report is for a periodic (P) or semi-persistent (SP) CSI-RS including one CSI-RS resource, the DD unit duration is based on a periodicity (p) of the P CSI-RS or the SP CSI-RS, and
wherein the DD unit duration for the P CSI-RS or the SP CSI-RS is one.

2. The UE of claim 1, wherein the DD basis vector length indicates a number of time units for a CSI-RS resource.

3. A base station (BS) comprising:
a processor; and
a transceiver operably coupled to the processor, the transceiver configured to:
transmit, to a user equipment (UE), information configuring a channel state information (CSI) report, wherein the information includes codebook configuration information on a codebook of type II Doppler; and
receive, from the UE, the CSI report based on the codebook configuration information,
wherein the codebook configuration information includes Doppler domain (DD) configuration information, and
wherein at least one of a DD unit duration or a DD basis vector length is based on the DD configuration information, wherein, when the CSI report is for an aperiodic (AP) CSI-RS including a plurality of AP CSI-RS resources, the DD unit duration is based on an offset indicated by the DD configuration information, wherein the offset is between two AP CSI-RS resources in the plurality of AP CSI-RS resources, wherein the DD unit duration for the AP CSI-RS is two or more, wherein, when the CSI report is for a periodic (P) or semi-persistent (SP) CSI-RS including one CSI-RS resource, the DD unit duration is based on a periodicity (p) of the P CSI-RS or the SP CSI-RS, and wherein the DD unit duration for the P CSI-RS or the SP CSI-RS is one.

4. The BS of claim 3, wherein the DD basis vector length indicates a number of time units for a CSI-RS resource.

5. A method performed by a user equipment (UE), the method comprising:

receiving, from a base station (BS), information configuring a channel state information (CSI) report, wherein the information includes codebook configuration information on a codebook of type II Doppler;

identifying at least one of a Doppler domain (DD) unit duration or a DD basis vector length based on DD configuration information included in the codebook configuration information; and transmitting, to the BS, the CSI report based on the codebook configuration information, wherein, when the CSI report is for an aperiodic (AP) CSI-RS including a plurality of AP CSI-RS resources, the DD unit duration is based on an offset indicated by the DD configuration information, wherein the offset is between two AP CSI-RS resources in the plurality of AP CSI-RS resources, wherein the DD unit duration for the AP CSI-RS is two or more, wherein, when the CSI report is for a periodic (P) CSI-RS or semi-persistent (SP) CSI-RS including one CSI-RS resource, the DD unit duration is based on a periodicity (p) of the P CSI-RS or the SP CSI-RS, and wherein the DD unit duration for the P CSI-RS or the SP CSI-RS is one.

6. The method of claim 5, wherein the DD basis vector length indicates a number of time units for a CSI-RS resource.

* * * * *